United States Patent [19]

Zenk et al.

[11] Patent Number: 4,648,065

[45] Date of Patent: Mar. 3, 1987

[54] MODIFIED SNAPSHOT PRIORITY ENABLING TWO REQUESTORS TO SHARE A SINGLE MEMORY PORT

[75] Inventors: Daniel K. Zenk, Stillwater; John R. Trost, Coon Rapids, both of Minn.

[73] Assignee: Sperry Corporation, New York, N.Y.

[21] Appl. No.: 630,141

[22] Filed: Jul. 12, 1984

[51] Int. Cl.[4] .............................................. G06F 13/18
[52] U.S. Cl. .................................................. 364/900
[58] Field of Search ........ 364/200, 900, 200 MS File, 364/900 MS File

[56] References Cited

U.S. PATENT DOCUMENTS 4,493,036  1/1985  Boudreau et al. .................. 364/200

FOREIGN PATENT DOCUMENTS 57-164388  8/1982  Japan .

Primary Examiner—James D. Thomas
Assistant Examiner—Michael J. Ure
Attorney, Agent, or Firm—Charles A. Johnson; Lawrence J. Marhoefer

[57] ABSTRACT

In an n-wide (n nominally equals 4) snapshot priority network apparatus the access of n+1 requestors to a memory unit is prioritized. Two requestors—the lowest priority one of normal system requestors called instruction processors plus a maintenance exerciser type requestor—share a single memory port which is nominally the lowest priority one of n such prioritized ports. Requests from both requestors are both honored upon a single priority snap, the instruction processor request nominally proceeding before the maintenance processor request. Although the n-wide priority network remains generally faster than any (n+1)-wide priority network, the maintenance exerciser type requestor is expediently serviced and cannot be locked out of access to memory by the competing higher priority requests of the instruction processor.

3 Claims, 14 Drawing Figures

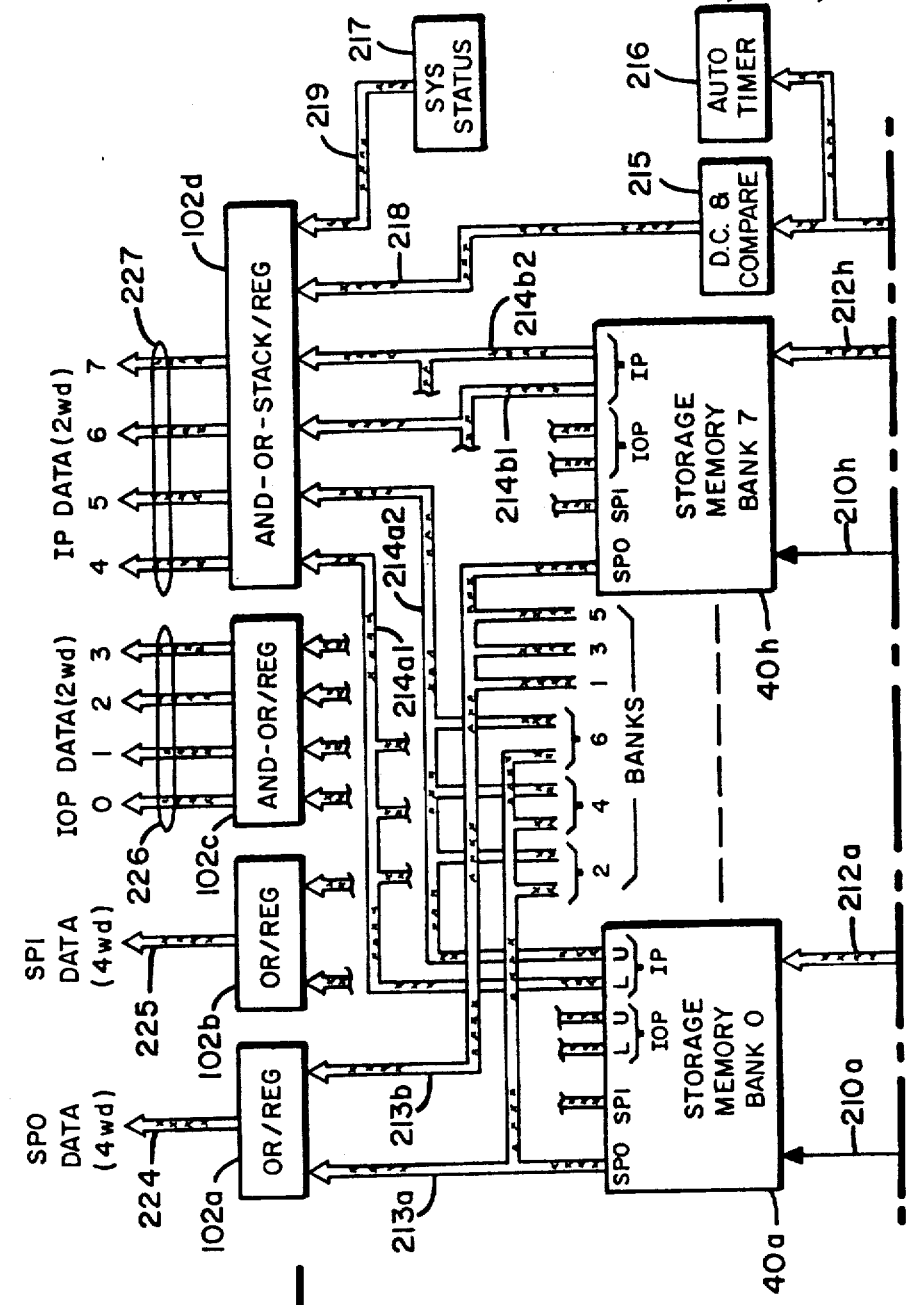

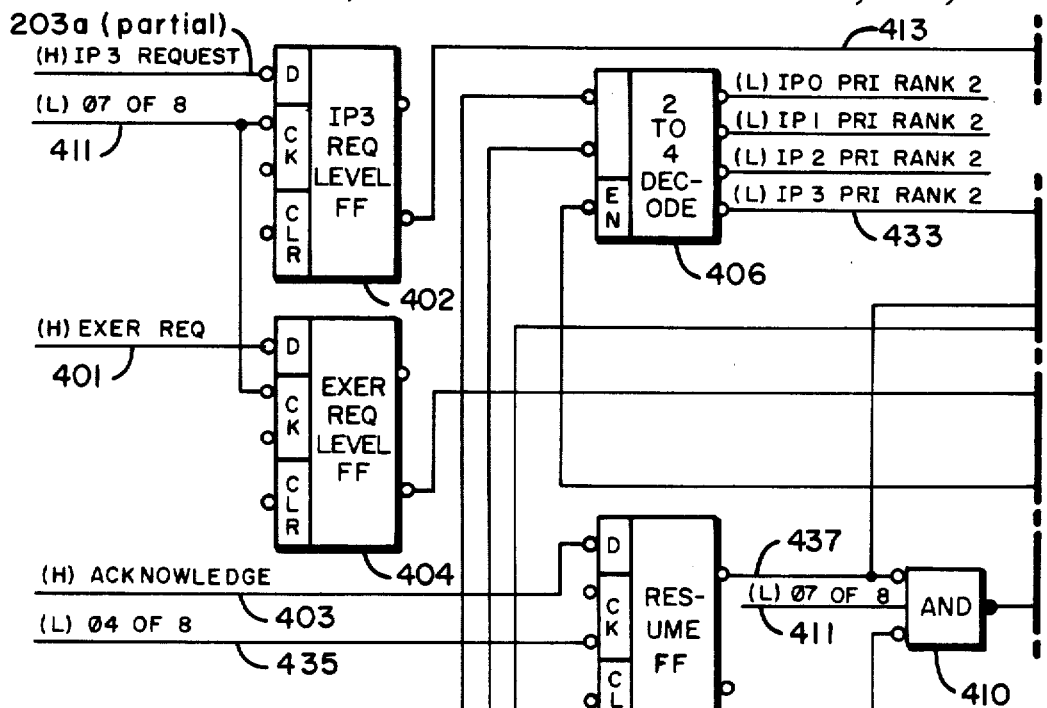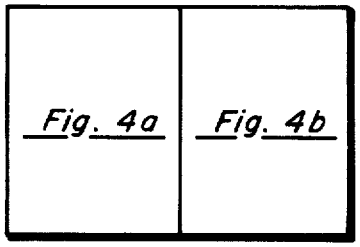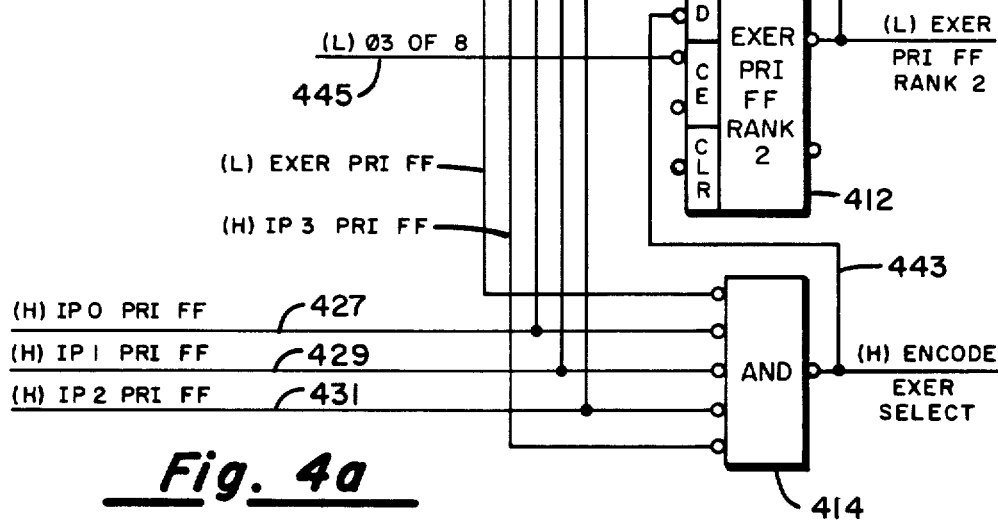

MODIFIED SNAPSHOT PRIORITY ENABLING TWO REQUESTORS TO SHARE A SINGLE MEMORY PORT

REFERENCE TO RELATED APPLICATIONS
CONTENTS
BACKGROUND OF THE INVENTION
A. Field of the Invention
B. Description of the Prior Art
SUMMARY OF THE INVENTION
BRIEF DESCRIPTION OF THE DRAWINGS
DESCRIPTION OF THE PREFERRED EMBODIMENT
  A. The Present Invention Resides in a High Performance Storage Unit (HPSU)
  B. The Problem Solved by the Present Invention
  C. General Description of the HPSU
  D. Detailed Description of the HPSU Block Diagram
  E. Timing of the HPSU Within Which the Circuit Apparatus of the Present Invention Resides
  F. The Circuit Apparatus of the Present Invention
  G. Timing Diagram of the Operation of the Present Invention
CLAIMS
ABSTRACT

REFERENCE TO RELATED APPLICATIONS

The instant application claims subject matter related to, and a circuit apparatus contained within a memory apparatus taught within, another patent application filed on Apr. 2, 1984, the other application being further identified as: U.S. Ser. No. 596,130 entitled "High Performance Storage Unit", filed in the name of J. H. Scheuneman.

The instant application also claims subject matter disclosed in a related application filed on the same day as the instant application, such other related application being further identified as:

U.S. Ser. No. 630,140 entitled "Forced Clear of a Memory Time-Out to a Maintenance Exerciser" filed in the names of D. K. Zenk, et al., now U.S. Pat. No. 4,590,586.

All three applications are assigned to common assignee Sperry Corporation, a corporation of the State of Delaware having a place of business at 1290 Avenue of the Americas, New York, New York 10019.

The instant application is related to the following co-pending patent applications:

Title: MULTIPLE OUTPUT PORT MEMORY STORAGE MODULE
Inventor: James H. Scheuneman and Gary D. Burns
Ser. No.: 596,214
Filed: Apr. 2, 1984

Title: READ ERROR THROUGH-CHECKING SYSTEM
Inventor: James H. Scheuneman Ser. No.: 354,340
Filed: Mar. 2, 1982, now abandoned Title: READ ERROR OCCURRENCE DETECTOR FOR ERROR CHECKING AND CORRECTING SYSTEMS
Inventors: Gary D. Burns and Scott D. Schaber Ser. No. 464,184, now U.S. Pat. No. 4,523,314
Filed Feb. 1, 1983

Title: MULTIPLE UNIT ADAPTER
Inventor: James H. Scheuneman
Ser. No.: 596,205
Filed: Apr. 2, 1984

Title: A PRIORITY REQUESTER ACCELERATOR
Inventors: John R. Trost and Daniel Zenk
Ser. No.: 530,285
Filed: Aug. 31, 1983

Title: PARTIAL DUPLEX OF PIPELINED STACK WITH DATA INTEGRITY CHECKING
Inventor: James H. Scheuneman, et al.
Ser. No.: 595,864
Filed: Apr. 2, 1984

Title: PIPELINED DATA STACK WITH ACCESS THROUGH-CHECKING
Inventor: James H. Scheuneman
Ser. No.: 596,131
Filed: Apr. 2, 1984

Title: MULTIPLE PORT MEMORY WITH PORT DECODE ERROR DETECTOR
Inventor: James H. Scheuneman
Ser. No.: 596,132
Filed: Apr. 2, 1984

Title: HIGH PERFORMANCE PIPELINED STACK WITH OVER-WRITE PROTECTION
Inventor: Wayne A. Michaelson
Ser. No.: 596,203
Filed: Apr. 2, 1984

Title: AN IMPROVED ACCESS LOCK APPARATUS FOR USE WITH A HIGH PERFORMANCE STORAGE UNIT OF A DIGITAL DATA PROCESSING SYSTEM
Inventors: Daniel K. Zenk and John R. Trost
Ser. No.: 596,202
Filed: Apr. 2, 1984

Title: MULTILEVEL PRIORITY SYSTEM
Inventors: James H. Scheuneman and W. A. Michaelson
Serial No.: 596,206
Filed: Apr. 2, 1984

Title: PIPELINED SPLIT STACK WITH HIGH PERFORMANCE INTERLEAVED DECODE
Inventors: James H. Scheuneman and W. A. Michaelson
Ser. No.: 596,215, now U.S. Pat. No. 4,600,986
Filed: Apr. 2, 1984

All applications are assigned to common assignee Sperry Corporation, a corporation of the state of Delaware having a place of business at 1290 Avenue of the Americas, New York, New York 10019.

BACKGROUND OF THE INVENTION

A. Field of the Invention

The present invention generally concerns the prioritization of requestors utilizing a digital computer memory servicing a plurality of such requestors. The present invention specifically concerns that modification which needs to be made to the snapshot scheme of prioritizing requests to a digital computer memory when two requestors share a single memory port. Since such modification will be seen to allow that requests arising from each such two requestors sharing a said prioritized single memory port will both be honored, in sequence, during a single priority scan, then such modification is not perceived to be of much efficacy over according each such requestor a separate port if (1) the requestors are often in contention and (2) separately prioritized ports are readily available. But if (1) separately prioritized ports are minimized in numbers in order to save time in the priority circuitry prioritizing simultaneous requests received at such, and (2) some two requestors are not often simultaneously contending to request a digital memory, then the modification to memory priority, specifically snapshot priotity, of the present invention which accords that two requestors should share but a single prioritized memory port is efficient in allowing n+1 requestors to utilize an n-wide priority network, and effective in minimizing the delay encountered in a priority network since an n-wide network is generally faster than an (n+1)-wide network. Further specifically, the present invention teaches that a memory maintenance exerciser type requestor, being a requestor generally but infrequently requesting a memory for the purposes of the operational validity checking and maintenance thereof, should share a single memory port with a normal requestor of such memory, nominally called an Instruction Processor, or IP.

B. Description of the Prior Art

The environment of the apparatus and method of the present invention is a very large scale, very high performance, digital computer memory unit such as is described in U.S. patent application Ser. No. 596,130. It is a known maintainability feature in the prior art for very large scale, very high performance, computer memory units that the memory stores of such units should be dynamically partitionable into those dedicated to applications and those upon which, the memory unit remaining on-line, operational validity checking and maintenance may be exercised. The utility of exercising maintenance—being the exercise and validity checking of logic, error correction/detection logic, and memory stores—upon part of the memory stores of a very large scale memory unit while such large scale memory unit is, in the areas of stores not being exercised for maintenance, elsewise devoted to applications operation, is that such maintenance may be often performed with minimum conflict to the system utilization of that system resource, the memory unit, which may be very expensive. The on-line maintenance exercise of parts of the stores of a very large scale memory unit also provides the maximum potential for the detection and isolation of intermittent fault phenomena within the logics of such memory units as well as within those stores of such units detached to on-line maintenance testing.

It is known in the prior art that the maintenance exerciser which administers the regimen of read, write, and partial write on-line testing to a portion of the stores of a high performance memory unit, which memory unit is elsewise involved in servicing systems applications with the other stores contained therein, may be either internal to such memory unit or external to such memory unit. In either case, however, there is usually an external agency to the memory which does both configure the memory for test (i.e., designate which of the memory stores are to be devoted to on-line memory test and which are to be devoted to systems applications) and shepherd the progress of such testing (if not actually administering same), obtaining the results thereof. In other words, even if a maintenance exerciser is internal to a very large scale memory unit, the fault detections of such maintenance exerciser needs be communicated to the computer system, and such computer system needs (if possible) reconfigure such high performance memory unit to operability, through an interface to such high performance memory unit. Such an interface is normally in the prior art a memory port fully capable of normal memory command, read, and write operation. The device connected to such an interface is normally called a maintenance processor, or a System Support Processor(SSP).

It is also known in the prior art that a single memory unit may communicate with a plurality of requestors, and may employ diverse priority schemes in the determination of which of such requestors shall be next serviced. One of such prior art priority schemes for the resolution of access between requestors communicating with a single memory unit is "snapshot" priority determination. In a "snapshot" priority scheme, the total one or ones of requestors which are attempting communication with the memory unit at a particular time will be frozen, or "snapped", into a queue. Such a queue will be completely serviced in priority order before any request not originally "snapped", or any reinstitution of "snapped" requests once serviced, will be registered or considered. Such scheme is tantamount to the taking of a photographic "snapshot" of pending memory requests, and servicing all such requests in priority order prior to the taking of another "snapshot".

An obvious accommodation between the prior art fully-functional ported access which is taken of a memory unit for the purposes of maintenance thereof (including through an internal maintenance exerciser operating on-line to the normal system operation of such memory unit) and a snapshot priority scheme at the requestor's interface to such memory unit is that the maintenance port, and the maintenance processor or system support processor requestor connected thereto, should be handled in such snapshot priorities equivalently to other system requestor types. Such is generally the scheme in the prior art, and it may be noted that the maintenance port is, in accordance with the test function performed thereon, normally accorded the lowest system priority in the snapshot or any other memory priority scheme.

It is also known in the prior art to configure a snapshot priority scheme so that requests from the exerciser and requests from a normal requestor external to such memory will share a single port of access to such memory. The utility of such sharing is that the breadth of the priority determination logics may be narrowed by the fact that the exerciser and a normal requestor do share a single port, and all internal control and data paths of the memory by which the exerciser, whether internal or external, does exercise such memory are, of course, identical to the paths elsewise utilized by the normal requestor sharing the same port of access. The process of "sharing" implies, however, its own, subsidiary, priority determination scheme. In the prior art, this subsidiary priority determination scheme was operationally effective, and was based on historical record keeping. Mainly, requests arising from the exerciser and from the normal requestor with which it shared a port were resolved, as between themselves, before further submission to the normal, snapshot, priority request scheme. A history was kept of each request occurring from the exerciser and from that normal requestor sharing the same port. If both the exerciser and the requestor sharing the same port made requests during the same priority snap, then normally the normal requestor only would be passed to further priority determination, wherein it would be ultimately honored in normal snapshot priority. A history of this occurrence was kept. Upon a next subsequent exerciser report request upon a next subsequent priority snap, such exercise port request would be honored regardless of whether there should be another, subsequent, request from the normal requestor sharing the same port or not. If there was such a next subsequent request from the normal requestor sharing the same port, it would be held waiting until the next priority snap to be gated to snapshot priority in preference over further requests of the exerciser, should such be present. The sharing of a port between an exerciser and a normal requestor thus was accomplished with first one, and then the other, going foremost upon any simultaneous requests from both. In order to determine which one should be foremost at any one time, history keeping of the requests of both was required.

SUMMARY OF THE INVENTION

The present invention is a method and apparatus for the modification of snapshot priority as performed by a memory unit for the prioritization of, and amongst, a plurality of ported requests to read or write such memory unit arising from a like plurality of requestors. In particular, the present invention concerns a modification of such memory snapshot priority as will accord that a normal requestor, making requests to read or write such memory, may share, in a snapshot priority scheme, a single prioritized port of such memory with a maintenance exerciser of such memory. A maintenance exerciser, which may be either internal to or external of, such memory, is but a circuit, or device, which reads or writes the memory, in a conventional manner to the reading or writing of normal memory requestors, to the end that the memory may be tested, and the correct functionality thereof determined. That such a maintenance exerciser, involved in the maintenance of a memory unit, should, at the threshold, share a port of access to such memory with a normal requestor of such memory is desirable because (1) the number of requestors servicable within a snapshot priority space of identical width is augmented by one, (2) the functionality of such memory exercised and validated by the exerciser will be, at least, substantially identical to that functionality of the memory elsewise seen by the requestor which does share the identical port, and (3) the width of the (snapshot) priority determination entwork will be minimized, allowing such network to operate faster.

The present invention permits of the maintenance exerciser and the normal requestor which do share a single port, and therefor but a single entrance into the snapshot priority evaluation scheme of a memory unit, to both be honored in a single priority snap. With the present invention, no history keeping concerning the honoring of competing requests from the exerciser and from the normal requestor sharing the same port needs be kept. Also, because both the exerciser request and that arising from the normal requestor sharing the same port will be honored within the same priority snap, a quicker average response to both such exerciser and such normal requestor is obtained than if the access of one such, either the exerciser or the normal requestor, to memory was alternately to be delayed until the next successive priority snap.

The circuit of the present invention functions to modify normal snapshot priority within a memory unit to cause that, upon such times as an exerciser and a normal requestor request are both present upon the same port, the normal requestor will be (first) honored, and the exerciser will be (next) honored both within the same priority snap. Such is accomplished by postponing a new priority snapshot for such additional time as will accord that both the requests of the exerciser and of that normal requestor which do share a single port of access into such snapshot priority may be honored within the same priority snap.

Consequently, it is a first object of the present invention that a memory unit operative with snapshot priority to honor a plurality of requests occurring on a plurality of ports of such memory unit, one of such ports being shared by both an exerciser and a normal requestor of such memory unit, may perform modified snapshot priority to the end that competing requests between such exerciser and such normal requestor which does share the same port may both be honored within that same priority snap upon which both requests were made.

It is a second, subsidiary, object of the present invention that the modification to snapshot priority of a memory unit which does accord that both an exerciser and a normal requestor which do share a same port into such memory unit may both be honored upon a same priority snap will additionally accord that the normal requestor shall be first satisfied, and then that the exerciser shall be next satisfied, in the satisfaction of both within the same priority snap. When that port which the exerciser and the normal requestor share is the lowest overall priority port within the overall snapshot priority scheme of the memory unit, then this sequence assures that the exerciser requests are of lowest overall priority, meaning last serviced within one priority snap, of all such requests occurring to the memory unit.

DESCRIPTION OF THE PREFERRED EMBODIMENT

Figure 1B:
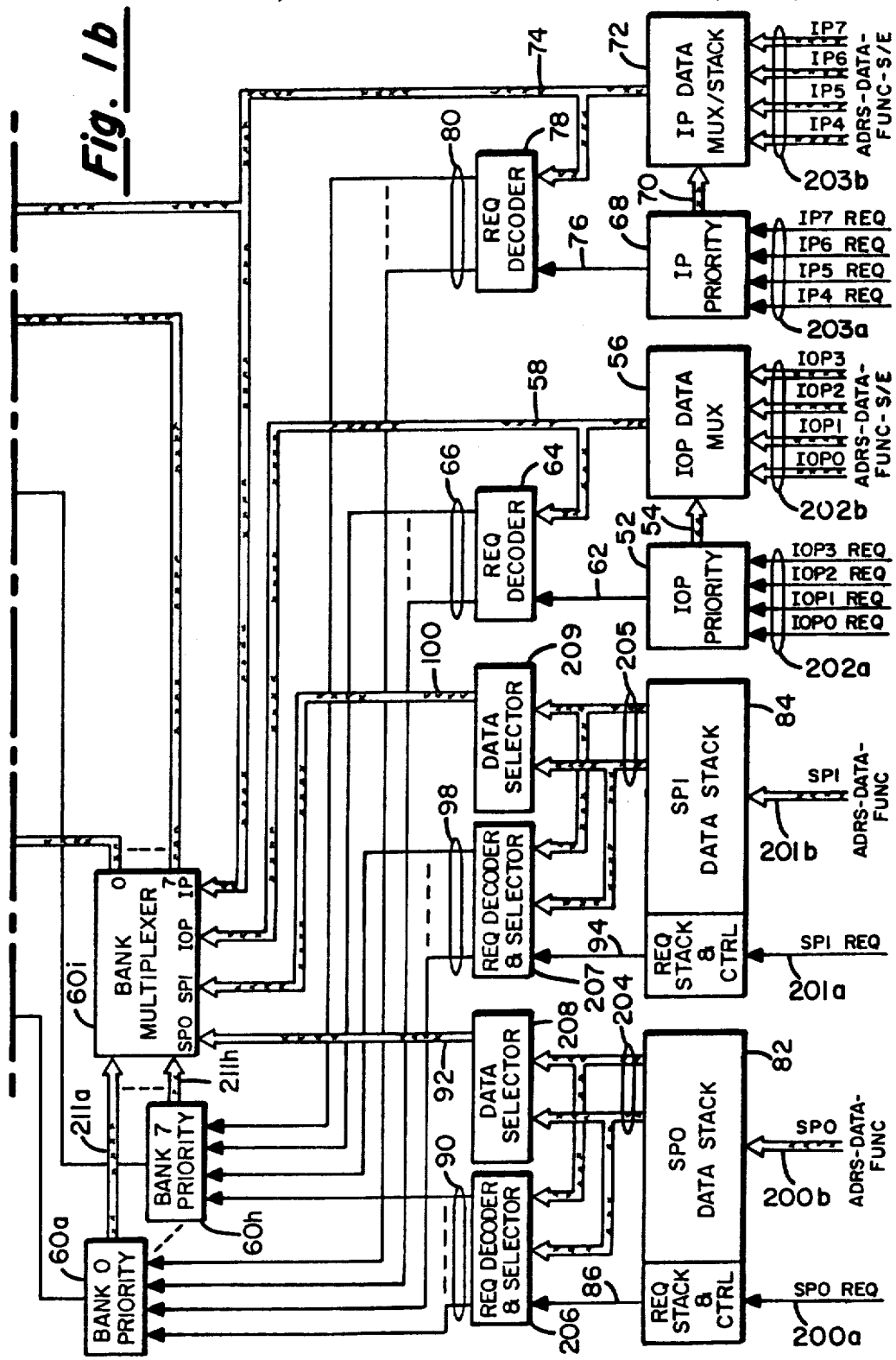
FIG. 1, consisting of FIG. 1a and FIG. 1b, shows a block diagram of the High Performance Storage Unit within which the present invention resides.

A. The Present Invention Resides in a High Performance Storage Unit (HPSU)

The present invention resides in, and is utilized in the functional performance of, a High Performance Storage Unit (HPSU) which is the subject of U.S. patent application Ser. No. 596,310, the entire contents of which are incorporated herein by reference. For the sake of completeness, certain of the description of such an HPSU is herein provided.

The HPSU resides in a digital data processing system which is essentially modular, and provides for parallel processing. Normally, from one to four Instruction Processors (IPO through IP3) will be interfaced to the HPSU. Each IP can, for example, be a Type 3054-00 unit available from Sperry Corporation, or such other Instruction Processor available commercially as would be compatible. The IP provides basic mode and extended mode instruction execution, virtual maching capability, and contains two buffer memories: one an operand buffer, and the other an instruction buffer. Each IP is functional to call instructions from memory, execute the instructions, and in general does data manipulation. The IP also executes instructions to set up input and output data buffers and channel access control. It is one of such IP's —specifically IP3—which is one of the two requestors which share a single memory port under the modified snapshot priority apparatus and method of the present invention.

In conjunction with the IPs, from one to four Input-/Output Processors (IOP0 through IOP3) are also normally interfaced to the HPSU. The interconnections between the HPSU and the IPs and the IOPs are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystem. In this type of configuration, the IPs function as the system Central Processing Units, and the IOPs act as CPUs to handle all of the communications. The IPs and IOPs are commonly referred to as the 1100/90 system.

From one to four High Performance Storage Units (HPSU0 through HPSU3) can be utilized in a system. Each HPSU is a free-standing unit with eight memory banks, each bank containing 524K storage data words. Error Correction Code (ECC) is used internal to each HPSU to provide single-bit error correction and double-bit error detection.

Each HPSU provides four Instruction Processor (IP) ports for providing communication paths to the IPs, both for reading and writing. Again it should be understood that inter-connection between each HPSU and each IP is directly cabled, and is not bused. Each HPSU also includes four Input/Output Processor (IOP) ports for interconnection with the IOPs. These interconnections are direct cables between each HPSU and each IOP. The IP and the IOP ports are each two-word read and write interfaces, where each word contains 36 data bits and is accompanied by four parity bits. The IOP and IP interfaces operate on a 60 nanosecond interface cycle time.

Each HPSU also includes at least one Scientific Processor (SP) port, and in the embodiment of this disclosure has two such SP ports. Each SP port has a four-word data interface. If a single SP is used with a single HPSU, it may be coupled directly to the SP port of such HPSU. When two or more HPSUs are used with an SP, it is necessary to provide a Multiple Unit Adapter (MUA) for each SP. Regardless of whether or not interfaced through a MUA, each SP interface reads or writes four words, where each word contains 36 data bits and is accompanied by four parity bits, upon each interface cycle time of 30 nanoseconds.

Each SP functions under direction of one or more of the IPs to perform scientific type calculations in a support mode. In this regard, the IPs can be considered to be host processors and the SPs can be considered to be support processors, all operating through the common storage of the HPSU(s).

The overall system maintenance and supervision is accomplished through one or two System Support Processors which are connected to all units of the system. The SSP is available commercially and is utilized in the Sperry Corporation 1100/90 Systems. In general, it is understood that each SSP performs the function of a hardware maintenance panel for the system. The display and setting of information, the activation at most maintenance facilities, selecting modes of operating and the like, is done at the control section of the SSP. The primary maintenance facility of the HPSU which is activated in order to obtain a test of the HPSU operational validity in reading, writing, and storing data is called the maintenance exerciser. Such maintenance exerciser is an internal logical capability of the HPSU, which capability may be implemented by a microprocessor executing firmware, to exercise the memory function. In the preferred embodiment of the invention it is this maintenance exerciser, which does make requests to read and write the memory stores equivalently as if it were a normal requestor and most specifically an IP type requestor, which does, with IP3, share a single memory port under modified snapshot priority within the preferred embodiment of the invention. The existence of an HPSU-internal maintenance exerciser needs not be specified for the utilization of the present invention. Indeed, an external SSP, which is an entire computer and which may be specified to be an IP-type or IP-equivalent computer, may directly perform the detailed test and exercise regimen which is suggested, in the preferred embodiment of the invention, to be better performed by specialized test logic within the HPSU. Indeed, the present invention will serve to allow any two like-type requestors normally communicative with two like-type memory ports to instead share, in the snapshot priority, but a single port. That two requestors should "share" a single port means that either requestor making a request upon such port will be serviced at the priority of such port, and if both requestors do simultaneously make requests upon the single port then, at the priority of such port amongst all ports, first one requestor and then the second requestor will each be sequentially serviced. Such functionality may sound but semantically different than that each such two "port sharing" requestors should each be individually prioritized until it is realized, amongst other things, that the priority network will remain "n" ports wide, and operate at speeds commensurate with the prioritization of "n" ports, while the number of requestors serviced by such priority network will be of number "n +1". In the preferred embodiment of the present invention n=4. Consider also that an (n=4)-wide snapshot priority network exists to prioritize amongst 4 IOP's. When the enhancement circuit of the present invention is utilized, then an identical snapshot priority network may be utilized to prioritize amongst a full 4 IP's plus another requestor, called a maintenance exerciser.

Continuing in the description of the HPSU within which the present invention resides, a clock system is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

Intercommunication between units is essentially on a Request and Acknowledge basis, and the interfaces will be described in more detail as appropriate.

B. The Problem Solved by the Present Invention

In the prior art the IP3 and maintenahce exerciser requests to their shared port were processed such that each would not be honored in the same priority snap upon which both requests were registered. In the request scheme, history was kept of each IP3 and maintenance exerciser request. If IP3 and maintenance exerciser both made requests upon same priority snap, then only the IP3 request would be honored. The maintenance exerciser request would then be honored in the next priority snap, regardless if there is an IP3 request or not. If there was an IP3 request, it had to wait until the next priority snap before getting honored. Consequently, history keeping was necessary for IP3 and maintenance exerciser requests in a priority request scheme.

With the use of the present invention, history keeping is unnecessary in honoring simultaneous IP3 and maintenance exerciser requests upon their jointly shared port. In the priority scheme of the present invention, IP3 and maintenance exerciser requests will both be honored in the same priority snap upon which both requests were registered. The IP3 request will be honored before the maintenance exerciser request. After honoring the maintenance exerciser request, which is of the lowest priority upon that port (the IP3-maintenance exerciser shared port) which is the lowest priority port amongst all (4) IP ports, then a new priority snap will transpire, again prioritizing requests upon all ports.

C. General Description of the HPSU

Before commencing with the detailed description of the present invention within sections F. and G., it is desirable to understand the HPSU within which the present invention resides which is generally described in the present section C. and particularly described in the following section D., and the timing of which is described in fillowing section E. If the routineer in the digital computer memory art who is familiar with the prioritization, and snapshot prioritization, of competing ported requests to read and write a jointly shared memory store does not wish to assimilate all the information in sections C., D., and E. in understanding the present invention, then the following absolute minimum teaching should be noted. First, the snapshot priority to which the circuit apparatus of the present invention constitutes an improvement is shown as IP PRIORITY 68 in FIF. 1b. The maintenance exerciser (not shown in FIG. 1) shares a single pricritized memory port with IP3, requests from which IP3 are received as signal IP3 REQ on cable 203a shown in FIG. 1b. Second, the second level priority network within the HPSU, called BANK 0 PRIORITY 60a through BANK 7 PRIORITY 60h (shown in Fig. 1b) does acknowledge the first level priority, e.g., IP PRIORITY 68, that a first-level-prioritized request is accepted and is being honored and is being acted upon by signal C' shown in FIG. 2, which signal may be observed to be distributed from PRI (BANK) 60 to IOP, IP DATA MUX IOP, IP PRIORITY 52 56, 68, 72 which includes IP PRIORITY 68. For the purposes of basic understanding of the teaching of the present invention, it needs be known that the snapshot priority network, to which the circuit of the present invention is an improvement, does receive requests such as those from IP3 and/or from the maintenance exerciser, and is (internally to the HPSU) acknowledged of the successive prioritization of such requests by a deeper level within the HPSU, this deeper level acting via signal C'. In other words, the improvement circuit of the present invention is activated by the receipt of (2) requests, it does act to successively prioritize such requests (the IP3 request before the maintenance exerciser request), and is released from completing each such successive request prioritization by, and only by, an internal acknowledgement signal from a deeper logic level, which internal acknowledgement signal essentially says "your (prioritized) request is received, accepted, and is being acted upon". Third and finally, the circuit of the present invention is timed by an 8 phase clock appearing as $8\phi$ CLOCK at the top of the timing diagram in FIG. 3. The occurence of an IP3 and/or maintenance exerciser request(s) shown as signal I in such FIG. 3, and the acknowledgement via signal C' (also shown in FIG. 3) to successive prioritized requests, do provide the timing framework within which the circuit of the present invention does operate. Signals I and C' will later be seen in FIG. 4.

Continuing now with the complete and entire general description of the HPSU within which the present invention resides, a block diagram of such HPSU is shown in Fig. 1, consisting of FIG. 1a and FIG. 1b. The HPSU is a storage device that is commonly accessible by the IPs, the IOPs, and the SPs via the MUAs. The various devices that can be coupled to the HPSU can have differing bit-widths of interface data transfer, and differing interface cycle times.

In the preferred embodiment, the HPSU utilizes eight Banks of storage devices, identified as STORAGE MEMORY BANK 0 40a through STORAGE MEMORY BANK 7 40h of which Banks 0 and 7 are illustrated. Though not specifically illustrated in FIG. 1, each storage memory Bank is comprised of four Memory Modules and each Bank has a total capacity of 524K data words. Such a word in memory is 36 data bits, and is accompanied by 8 bits which are utilized for Error Correction Code (ECC) check bits, and for parity bits. Each storage memory bank is arranged for receiving four words (W1, W2, W3, and W4), and for reading out four words upon each read/write cycle time.

The STORAGE MEMORY BANKS 40a through 40h include the addressing circuitry, the storage cells, the timing circuits, and the driver circuits, and can be constructed from commercially available components, it being understood that the accessing rate (read/write cycle time) must accomodate the interface rates (interface cycle times) with the attached units.

The wide lines indicate directions of data flow, and the single lines indicate control flow.

At the input, the HPSU has an IOP interface 202 which can accommodate up to four IOP units at the four IOP ports labelled IOP0 through IOP3. It also has an IP interface 203 which can accommodate up to four IPs at the four IP ports designated IP0 through IP3. The IOP ports 202 and the IP ports 203 each operate to receive two data words (if a write is directed) plus address, function, and start/end data using an interface clock cycle time of 60 nanoseconds.

The HPSU also has two input SP interfaces 200 and 201 which can accommodate two SPs at the two ports labelled SP0 and SP1. The SP input ports each function to receive four data words (if a write is directed) plus address and function data upon each interface cycle time of 30 nanoseconds.

The request and control signals from the IOP ports 202 are passed to the IOP PRIORITY 52, which functions to select the particular IOP to be given priority of access to the memory system. The selection is passed on line 54 to the IOP DATA MUX 56 which functions to select the appropriate data and address information to pass on line 58 to the BANK MULTIPLEXER 60. The control signals provided on control path 62 drive the REQ DECODER 64 for selecting one-of-eight control lines 66 for providing control signals for making storage memory bank selection.

In a similar manner, the IP ports 203a provide request signals to the IP PRIORITY 68, which provides control signals on control line 70 to the IP DATA MUX /STACK 72 for selecting the data and address signals that will be provided on path 74. Similarly, the control signals on lines 76 to the REQ DECODER 78 results in signals being provided to select one of eight lines 80 for controlling storage memory bank selection.

The two SP ports 200 and 201 are each arranged to store requests in REQ. STACK & CTRL 82, and in REQ. STACK & CTRL 84. Additionally to SP requests, SP data and address and function are temporarily held in SP0 DATA STACK 82 or SP1 DATA STACK 84 awaiting availability of the memory system. In essence, the SP0 stacks and the SP1 stacks are each a first-in-first-out (FIFO) circulating buffer. The request information feeds out of REQ. STACK & CTRL 82 on line 86 to the REQ. DECODER & SELECTOR 206 which provides a one-of-eight selection while data and address and function pass on line 204 to DATA SELECTOR 208 and then to BANK MULTIPLEXER 60. Similarly, request information passes on line 94 from REQ. STACK & CTRL 84 to REQ. DECODER & SELECTOR 207 for making selections on lines 98, while the data and address and function passes on line 205 to DATA SELECTOR 209 and then to BANK MULTIPLEXER 60.

The BANK 0 PRIORITY 60a through BANK 7 PRIORITY 60h each function to select between the IOP, IP, and the two SP requests presented to each for accessing memory. Each also functions to control the associated storage memory bank, STORAGE MEMORY BANK 0 40a through STORAGE MEMORY BANK 7 40h, to cycle and also to emplace data read upon one of the four storage memory output ports SP0, SP1, IOP, and IP of such storage memory banks, which storage memory output ports are respectively connected to SP0 wired-OR communication buses 213, to an SP1 bus (not fully shown) like buses 213, to an IOP bus (not fully shown) like buses 214, and to IP wired-OR communication buses 214.

The HPSU has an IOP output AND-OR/REG. 102c capable of handling the IOP memory resource port connection to four IOPs: IOP0 through IOP3. It also has an IP output AND-OR-STACK/REG. 102d capable of handling IP the memory resource port connection to four IPs labelled IP0 through IP3. Finally, it has SP output OR/REG. 102a and OR/REG. capable of handling the respective two SP memory resource output ports labelled SP0 and SP1. Data rates and timing at the output ports 224, 225, 226, and 227 are commensurate to those for the corresponding memory resource input ports previously described.

Each HPSU is assigned an address range of 4M 36-bit words. Each STORAGE MEMORY BANK 40a through 40h contains 512K words, and there are eight such banks within an HPSU. A bank is four words wide. Each bank operates independently of the other bank(s). Each receives request and output multiplexing control through the associated bank priority via a respective one of cables 210a through 210h, while receiving function plus start/end control (utilized in partial word operations) from the BANK MULTIPLEXER 60i via the respective one of cables 2212a through 212h. Each receives data and address information from the BANK MULTIPLEXER 60i also via the respective one of cables 212a through 212h.

There are four storage memory output ports for each storage memory bank, consisting of one IOP, one IP, and two SPs (SP0 and SP1) output ports. All data read to any of the IOPs (0–3) is transmitted through the storage memory IOP port, and all data read to any of the IPs is transmitted through the single storage memory IP port at each storage memory bank.

That wired-OR communication bus 214, for example, does carry the data read to the IP memory resource output port and thence to any of the four IPs (IP0 through IP3) requires that the output register/drivers of such memory resource port, AND-OR-STACK/REG. 102d, should be able to logically multiplex the read data received on bus 214 to an appropriate one IP. The AND-OR-STACK/REG. is controlled to do so by address signals (path not shown) received from the IP DATA MUX/STACK 72 and by priority port code signals (path not shown) received from IP PRIORITY 68. Likewise, the IOP memory resource port output register/drivers is controlled to logically multiplex data received upon a wired-OR communication bus to an appropriate destination IOP0 through IOP3 by signals received from IOP DATA MUX 56 and IOP PRIORITY 52 (paths not shown).

The HPSU provides a Dayclock, auto recovery timer, System Status register, maintenance exerciser, and an MCI interface. Odd parity is checked/generated across all interfaces for the IP's, IOP's, and SP's.

The function of the HPSU, including in the performance of the present invention, is discussed in greater detail in the next following section D.

D. Detailed Description of the HPSU Block Diagram

The block diagram of the present invention of a High Performance Storage Unit (HPSU) is shown in FIG. 1, consisting of FIG. 1a and FIG. 1b. The HPSU supports input and output interfaces to and from ten requestors: from and to Scientific Processor 0 (SP0) respectively across cables 200 and 224, from and to Scientific Procressor 1 (SP1) respectively across cables 201 and 225, from and to four Input Output Processors (IOP 0–IOP 3) respectively across cables 202 and 226, and from and to four Instruction Processors (IP0–IP3) respectively across cables 203 and 227. The HPSU contains eight storage memory banks, STORAGE MEMORY BANK 0 40a through STORAGE MEMORY BANK 7 40h, each containing 512K words for a total of 4M 36-bits words of memory storage. Remaining parts of the HPSU shown in FIG. 1 are the data and control paths, and the logic structure, which does support of the interface of the ten requestors to the eight storage memory banks.

Considering first the data interfaces to the Scientific Processors - the data input from SP0 via cable 200b and output to SP0 via cable 224 plus the data input from SP1 via cable 200b and output to SP1 via cable 225— such interfaces are uniformly four data words in width. Such four data words are transferable, bank priority conflicts and pending requests permitting, at an interface cycle time of 30 nanoseconds. Additionally received upon cables 200b and 201b, respectively from SP0 and SP1, is addressing and function information. There are 144 data lines in cables 200b and 201b plus 16 accompanying parity bits. There are also 6 function/write enable lines plus accompanying 1 parity bit. These 6 lines consist of 2 lines (2 bits) for function and 4 lines (4 bits) for the master word write enables (corresponding to the 4 words) plus 1 accompanying parity line (bit). There are also 22 address lines (allowing addressing at four-word boundaries within the collective storage memory banks, STORAGE MEMORY BANK 0 40a through STORAGE MEMORY BANK 7 40h. The requests of the HPSU by respective SP0 and SP1 is caried on respective interface communication lines 200a and 201a. The output cables 224 225 carry four words or 144 bits of read data, plus 16 parity bits.

Continuing in FIG. 1 with the interfaces to the HPSU, the HPSU supports of four "data"0 interfaces from and to four IOP's, IOP0 through IOP3, on respective cables 202b and 226. The interface to each IOP is two 36-bit words in width. Such two words may be transferred to such IOP's collectively at rates as fast as two words each 120 nanoseconds, and to an individual IOP at a rate of two words per 300 nanoseconds. Such slower rate to an individual IOP exists because of communication times across the interface. There are 72 data lines plus 8 accompanying parity lines in each of the cables 202b as receive communication from each IOP. There are additionally 24 address lines plus an accompanying 4 parity lines within the cables 202b communication path from each IOP. The greater number of address lines (24) upon the IOP ports than upon the SP ports (22) allows of addressing at the word boundaries within the collective storage memory banks. Finally, each IOP interface upon cables 202b carries 5 function lines plus an accompanying 1 parity line, and 12 lines carrying the start/end bits plus an accompanying 2 parity lines. The request signals from each of up to four IOP's are received via a dedicated line for each upon cable 202a. Each of the output cables 226 to each of the four IOP's carries 72 bits of read data, plus an accompanying 4 parity bits, on 80 total lines.

Likewise to the interface to the IOP's, the HPSU block diagrammed in FIG. 1 supports of an interface to four Instruction Processors, or IP's: the receipt of data and address and function and start/end information from the IP's which transpires on cable 203b, the receipt of requests from the IP's which transpires on cable 203a, and the issuance of data to the IP's which transpires via cable 227. The width of each data transfer is two words. The rate of data transfer may be as great as eight words per 240 nanoseconds for the IP's collectively during the block read operation thereto. For normal, non-blocked, read, the data transfer rate is identical to the IOP's at two words per 120 nanoseconds collectively. Again, the maximum data transfer rate to a single IP is two words per 300 nanoseconds, the lesser rate being due to the fact that multiple requests are not stacked (as will be seen to be the case for the SP's) and the interfacing time required to transmit an acknowledge from the HPSU to an IP, to process such within an IP, and to transmit a subsequent request to the HPSU. The number of signal lines and accompanying parity lines, within those cables 203a, 203b, and 227 of interface to the four IP's are identical to the numbers of lines within those corresponding cables 202a, 202b, and 226 of interface to the IOP's. In summary, there exists two SP ports each with a width of four data words, four IOP ports each with a width of two data words, and four IP ports each with a width of two data words in data communication between requestors and the HPSU.

Continuing in FIG. 1 with the explanation of the communication path to a Scientific Processor (SP), the data received upon such SP port is stacked in a 9-deep stack, the SP0 DATA STACK 82 or SP1 DATA STACK 84. Within these 9 locations for stacking data to be written within the HPSU, up to 8 may be filled at any one time with the remaining, 9th, left open. The ninth location is left open to augment performance in accordance with the teaching of U.S. patent application Ser. No. 596,203. Stacking of functions and addresses is also done on the Scientific Processor ports, such stacking as is additionally done in the structures labelled SP0 DATA STACK 82 and SP1 DATA STACK 84. The stacking of functions is in the 9-deep arrangement, but the address stack actually consists of two 4-deep address stacks without a ninth location. Such address stack, as well as the data and function stack, are controlled by the pending requests respectively held eight deep in REQ STACK & CTRL 82 and REQ STACK & CTRL 84 for the respective SP0 and SP1 ports. The splitting of the address stack into two 4-deep halves is made so that the decoding of the address of a next uppermost pending request may be made before an acknowledge is received for that current request which is outstanding, i.e., which has been issued to the memory banks for service thereupon. The mode and manner by which requests, addresses, and data may be stacked in a pipeline in order to expedite the communication thereof from a requestor SP to the HPSU is contained within the aforementioned U.S. patent application Ser. No. (596,203) for a HIGH PERFORMANCE PIPELINED STACK WITH OVER-WRITE PROTECTION to Michaelson, the contents of which are incorporated herein by reference.

Continuing in FIG. 1, and recalling that the up to eight addresses as are stored in each of SP0 DATA STACK 82 and SP1 DATA STACK 84 are split into two half-stacks, called the odd stack and the even stack, so that a performance increase may be registered with the advance translation of such addresses immediately upon the issuance of an acknowledge, such addresses are passed by twos, one address associated with odd stack and called the odd address (although this means nothing as regards the actual location within the storage memory banks to be addressed) and another address associated with the even stack and called the even address, across cables 204 from SP0 Data Stack 82 to REQ DECODER & SELECTOR 206 in the case of SP0 interface, or across the two halves of cable 205 between SP1 DATA STACK 84 and REQ DECODER & SELECTOR 207 in the case of the SP1 interface. The stacked requests of REQ STACK & CTRL 82 for the SP0 interface are also received at the REQ DECODER & SELECTOR 206 via line 86, while the stacked requests of REQ STACK & CTRL 84 for the SP1 interface are received at REQ DECODER & SELECTOR 207 via line 94. The actual address bits received at the REQ DECODER & SELECTORS 206, 207 are four in number: address bits 2, 19, 20, 21 of which bits 2, 20, and 21 are utilized for four-bank interleave and of which bits 19, 20, and 21 are utilized for eight-bank interleave. Specifically, those address bits 2, 20, and 21 (or 19, 20 and 21) as are involved in bank selection do allow that the REQ DECODER & SELECTOR 206, 207 do, responsively to a received request, decode one of the selected bank priorities, BANK 0 PRIORITY 60a through BANK 7 PRIORITY 60h, furthering the request only to the one selected bank priority. Immediately upon the decoding and the sending of such request to one of the eight bank priorities, BANK 0 PRIORITY 60a through BANK 7 PRIORITY 60h, another request, and another address, are respectively received from the REQ STACK & CTRL and from the DATA STACK 82, 84 via respective cables 86, 94 and 204, 205 into the REQ DECODER & SELECTOR 206, 207, wherein such next subsequent requests and addresses are immediately decoded prior to the receipt of an acknowledge that the memory banks should have completed the previous request. Upon receipt of a bank acknowledge (path not shown) from the bank priority selection (as uppermost in priority) of the first-issued request, then the REQ DECODER & SELECTORs 206, 207 will issue this second, already decoded request. All stacked requests, and the decode thereof in the REQ DECODER & SELECTOR 206, 207, is on a first-in, first-out basis. The return acknowledge signal from the bank priority, BANK 0 PRIORITY 60a through BANK 7 PRIORITY 60h, to the REQ DECODER & SELECTOR 206 207, and additionally to REQ DECODER 64, 78, is not shown in the block diagram of FIG. 1.

Continuing in FIG. 1, in a like manner by which four bits of the address were passed from DATA STACK 82, 84 via cables 204, 205 to REQ DECODER & SELECTOR 206, 207, a remaining 18 address bits 144 data bits, and 6 function bits (+ parity) are passed from DATA STACK 82, 84 via cables 204, 205 to DATA SELECTOR 208, 209. Each of two paths of width 161 bits plus parity within each of cables 204, 205 supports that the data, and the remaining bits of address, associated with a next subsequent requested memory location should become lodged within DATA SELECTOR 208, 209, even prior to the receipt of an acknowledge from the bank priorities, BANK 0 PRIORITY 60a through BANK 7 PRIORITY 60h, which indicates that the memory has acted upon a previous request (path of such return acknowledge not shown in FIG. 1). Similarly to the dual paths between each SP0 DATA STACK 82 and REQ DECODER & SELECTOR 206, and between SP1 DATA STACK 84 and REQ DECODER & SELECTOR 207, the dual paths between SP0 DATA STACK 82 and DATA SELECTOR 208, and between SP1 DATA STACK 84 and DATA SELECTOR 209, support of improved performance due to time-overlap. The DATA SELECTORs 208, 209 do supply via respective cables 92, 100, both 144 bits of data, a (remaining) 18 bits of addressing, and 6 bits of function (plus parity) to the respective SP0, SP1 ports of BANK MULTIPLEXER 60i.

Continuing in FIG. 1, two-word-width interfaces are accorded to each of four input output processors, IOP0 through IOP3, and like two-word-width-interfaces are accorded to each of four Instruction Processors, IP0 through IP3. Upon such interface up to four requests simultaneously arising undergo selection in a first level priority. Requests from IOP0 through IOP3 respectively received as signals IOP0 REQ through IOP3 REQ on cable 202a are selected amongst in IOP PRIORITY 52 to produce a single, highest priority one, request output on line 62. Responsively also to said first-level-priority selected one request, the IOP PRIORITY 52 controls via two multiplexed selection lines 54 the IOP DATA MUX 56 to select amongst data, address, function, and start/end field information received as signals IOP0 ADRS-DATA-FUNC-S/E through IOP3 ADRS-DATA-FUNC-S/E on cable 202b. In a like manner, first-level IP priority 68 does select amongst signals IP0 REQ through IP3 REQ on cable 203a to pass a highest priority one such request via line 76 to REQ DECODER 78. Simultaneously, such IP PRIORITY 68 will control via two multiplexed selection lines 70 the IP DATA MUX/STACK 72 to select amongst the data, address, function and start/end field information received upon four channels as signals IP0 ADRS-DATA-FUNC-S/E through IP3 ADRS-DATAFUNC-S/E on cable 203b. The IP DATA MUX/STACK 72 is to be distinguished from the IOP DATA MUX 56 for incorporating a stack capability in the enablement of the block write function, essentially the receipt of write requests to two consecutive addresses. The stacking of two such addresses in enablement of a block write should not be confused with the 8-deep stacking of requests as occurred upon the SP0 and SP1 channel interfaces. The block write function enables firstly that two words plus two words should be sequentially received upon the interface to an IP performing the block write function and that such will be combined into 4 words transferred at one time to DATA MULTIPLEXER 60i and thence to be written in memory "x", and secondly that another two words plus two words are sequentially received, combined, and written in memory "x+1".

Continuing if FIG. 1, the first-level prioritization of the four IOP ports and the four IP ports in respective IOP PRIORITY 52 and IP PRIORITY 68 is received via respective lines 62, 76 at respective REQ DECODER 64, 78 along with four bits of address via respective cables 58, 74. From three of such address bits as do provide for bank selection (bits 2, 20, and 21 or bits 19, 20, and 21), each REQ DECODER 64, 78 does activate (only) one request line of respective cables 66, 80, which one active request line is received at one of the eight bank priorities, BANK 0 PRIORITY 60a through BANK 7 PRIORITY 60h. If two data words, which is the nominal number, are associated with such IOP or IP write requests, then such two data words are emplaced in both the upper two words (word 0 and word 1) and the lower two words (word 2 and word 3) of a four-word field by respective IOP DATA MUX 56 or IP DATA MUX/STACK 72, with the resultant four-word field emplaced on respective cables 58, 74 for transmission to the respective IOP and IP ports of BANK MULTIPLEXER 60i. As will be later seen, communication with the memory stores is at the 4-word-width level being that four words are contained one each within four parallely operative storage modules within each memory bank. Therefore, the alignment of two words within a four-word field is performed immediately at the IOP DATA MUX 56 (in the case of IOP communication) or at the IP DATA MUX/STACK 72 (in the case of IP communication), each memory bank being later controlled in the four storage modules contained therein to selectively write only the upper, or the lower, two words, as the case may be. In a like manner, it is possible for an IOP or an IP to command the writing of but a single word at any location, word 0 through word 3, within the 4-word boundary. Again, the single word will be properly positioned within the word 0 through word 3 location of a 4-word block by the IOP DATA MUX 56 or the IP DATA MUX/ STACK 72. It is the selection control which will later be applied to the storage memory banks which will cause only the appropriate word to be written. Finally, it is possible during a block write operation such as is exercised only by the IP that the IP DATA MUX/STACK 72 should receive, responsively to the block write function code, two successive two-word transmissions of data from an IP, combining both such successive transmissions to be one (word 0 through word 3) four-word block which is emplaced on cable 74 for communication to BANK MULTIPLEXOR 60i. It should thusly be noted that although the interface to the IOP and to the IP is at a granularity of two words per communication cycle, both cable 58 and cable 74 are four words in width.

Continuing in FIG. 1, it is thusly to be noted that the second-level, or bank, priority in the elements of BANK 0 PRIORITY 60a through BANK 7 PRIORITY 60h does each receive a maximum of four requests to prioritize, which requests are resultant from the SP0 interface via cable 90, from the SP1 interface via cable 98, from the IOP interface via cable 66, and/or from the IP interface via cable 80. Each of the bank priorities, BANK 0 PRIORITY 60a through BANK 7 PRIORITY 60h does prioritize the four requests received to communicate one such request —SP0 requests being of higher priority than SP1 requests being of higher priority than IOP requests being of higher priority than IP requests—to the associated storage memory bank, respective STORAGE MEMORY BANK 0 40a through BANK 7 40h. Communicated on cables 210a through 210h respectively connecting BANK 0 PRIORITY 60a to STORAGE MEMORY BANK 0 40a through BANK 7 priority 60h to BANK 7 40h are four word addressing enabling signals which do enable the respective four storage modules within each memory bank for the selection of all four words (word 0 through word 3), the upper two words (word 0 and word 1), the lower two words (word 2 and word 3), or a single word (word 0 or word 1 or word 2 or word 3) to be written within the respective four storage modules of each memory bank. This word addressing enablement is derived from the least significant two bits, bit 22 and bit 23, of those five bits of addressing information initially received at REQ DECODER & SELECTOR 206, 207 or REQ DECODER 64, 78. Thus by addressing proceeding from the request decoders and the bank priority are individual words (of four such) selected within each of the memory banks (eight such).

The bank priorities, BANK 0 PRIORITY 60a through BANK 7 PRIORITY 60h, just discussed as receiving request signals plus two bits of addressing information also perform a pretranslation of the function codes which direct the ultimate full and partial word reads and writes, and the test-and-set and test-and-clear functions, of the storage memory banks, STORAGE MEMORY BANK 0 40a through STORAGE MEMORY BANK 7 40h. Such pre-translation transforms the 5-bit function code (plus associated parity) from IP or IOP ports or the 6-bit function code (plus associated parity) from an SP port which is associated with the request now prioritized, plus the start and end fields each of 6 bits (plus associated. parity).associated with such functions upon the IP or IOP ports, into a uniform format. Now the storage memory banks could be charged with directly receiving, translating and acting upon the entire functions which deal with such storage memory banks (i.e., excluding functions dealing with the dayclock, system status register, error function register, etc.). The simple functions that the storage memory modules perform are well known in the art and beyond the teaching of this application. All necessary function code and start/ end fields for the accomplishment of such functions could be specified to be routed only along with data and address from the various ports and through the BANK MULTIPLEXER 60i to the storage memory banks. However, the apparatus of the present invention saves a small amount of time in each exercise of a storage memory module by doing some of that function translation which might normally be associated with such modules within the bank priorities, BANK 0 PRIORITY 60a through BANK 7 PRIORITY 60h. Thus the bank priorities might have been called bank priority and control. The path by which the bank priorities, BANK 0 PRIORITY 60a through BANK 7 PRIORITY 60h, do receive 5 or 6 bits of function code (plus associated parity bit) and 12 bits of start/end fields is not shown in FIG. 1, although, as could be imagined, such a path is substantially identical to that proceeding through REQ DECODERs 206, 207, 64, and 78 via respective cables 90, 98, 66, and 80 to BANK 0 PRIORITY 60a through BANK 7 PRIORITY 60h. Similarily, the lines of control which proceed from BANK 0 PRIORITY 60a through BANK 7 PRIORITY 60h to respective STORAGE MEMORY BANK 0 40a through STORAGE MEMORY BANK 7 40h are not specifically shown in FIG. 1, although these lines are parallel to cables 210a through 210h. Again, that a pre-translation function has been moved outside the storage memory banks to be accomplished upon an earlier stage in the pipeline is purely a design decision of significance only in that a routineer in the art of digital memory design should be attentive to such an option in the creation of well balanced pipeline stages in the implementation of a very high performance memory.

Considering the prioritization function discussed within the second preceding paragraph, it is to be noted that the bank priorities, BANK 0 PRIORITY 60a through BANK 7 PRIORITY 60h, do receive of but four request inputs because four IOP ports have been previously prioritized into one signal by IOP PRIORITY 52 while four IP ports have been previously prioritized into one signal by IP PRIORITY 68. The number of requests which are prioritized by a priority network positively correlates with the required operational time of such a network. In other words, the time needed to decode a 1 of N priority increases as N increases. Consequently, that the bank priorities need prioritize only four requests allows such to operate faster than if such were to prioritize amongst the total ten ports (two SP's, four IOP's, and four IP's) upon which the HPSU communicates. Furthermore, it is to be noted that requests arising from the SP's are directly routed to the bank priorities, with only the competing requests of the IOP's and of the IP's going through a first-level priority determination. Consequently, the priority scheme of the present HPSU may be considered a 2-level priority scheme, the purpose of which is to optimize performance to two SP requestor ports, while simultaneously supporting access by a large number of additional requestors (four+four) on two ports. Further function of the 2-level priority determination of the present invention is described in U.S. patent application Ser. No. 596,206 for MULTI-LEVEL PRIORITY SYSTEM to Scheuneman, et al., the contents of which are incorporated herein by reference.

Continuing in FIG. 1, the BANK MULTIPLEXOR 60i receives four words of data plus 17 bits of address (plus parity) upon each of four portals: those to SP0, SP1, IOP, and IP. The four words of data received on each portal is directed to a storage memory bank, STORAGE MEMORY BANK 0 40a through STORAGE MEMORY BANK 7 40h, under the multiplex selection control respectively received from BANK 0 PRIORITY 60a through BANK 7 PRIORITY 60h on respective cables 211a through 211h. Such data will be written (in the case of a write function) into the storage memory banks, STORAGE MEMORY BANK 0 40a through STORAGE MEMORY BANK 7 40h, by four words, or by two words, or by single word under the control of word selection received from respective BANK 0 PRIORITY 60a through BANK 7 PRIORITY 60h via respective cables 210a through 210h. The addresses received into BANK MULTIPLEXOR 60i through portals SP0, SP1, IOP, and IP which addresses are 17 bits in length and sufficient therefore to address any four word boundary within each of the storage memory banks which do each contain 512K words—are likewise gated to memory banks, STORAGE MEMORY BANK 0 40a through STORAGE MEMORY BANK 7 40h, via respective cables 212a through 212h also under the gating control of signals arising at BANK 0 PRIORITY 60a through BANK 7 PRIORITY 60h which connect to such BANK MULTIPLEXOR 60i via cables 211a through 211h. It should be recognized that the 4-word width data and accompanying address which is being gated through BANK MULTIPLEXOR 60i from the SP0, SP1, IOP, and IP under the control of the bank priorities BANK 0 PRIORITY 60a through BANK 7 PRIORITY 60h is all being gated simultaneously. The bank priorities, BANK 0 PRIORITY 60a through BANK 7 PRIORITY 60h resolve competing requests from multiples of the SP0, SP1, IOP, and IP requestors so that the request of IOP is gated before the request of IP is gated before the request of SP0 is gated before the request of SP1. The maximum number of storage memory banks, STORAGE MEMORY BANK 0 40a through STORAGE MEMORY BANK 7 40h, which may be simultaneously activated responsively to the four gatings of 4-word-wide data plus accompanying address through the BANK MULTIPLEXOR 60i is actually 5, and not 4. Five of the storage memory banks may be activated only upon the non conflicting requests to such from SP0, SP1, the highest priority IOP, and a highest priority IP which is also performing the block read operation. All eight storage memory banks, which have a 90 nanosecond cycle time, may be simultaneously active from having been activated upon successive 30 nanosecond periods.

Continuing in FIG. 1, and returning to the manner of granting priority in order that timing may be first discussed, it should be known that upon the granting of bank priority by BANK 0 PRIORITY 60a through BANK 7 PRIORITY 60h an acknowledge signal is returned, via paths not shown, to the respective one of the ports which did give rise to that request now gated in bank priority. Such acknowledge(s) is (are) returned either to REQ STACK & CTRL 82, to REQ STACK & CTRL 84, to IOP PRIORITY 52, and/or to IP PRIORITY 68 to inform such that a request has been gated to the appropriate memory bank, and that the requestor may be acknowledged and another subsequent request obtained therefrom. In the case of the SP0 and SP1 interface ports, such next subsequent request from the SP goes on the 8-deep request stacks. Also responsively to such acknowledge, the SP0 DATA STACK 82, the SP1 DATA STACK 84, the IOP DATA MUX 56, and the IP DATA MUX/STACK 72 will be controlled by the associated request logic to no longer hold the current data and address upon the paths to BANK MULTIPLEXOR 60i, but rather to emplace next subsequent data and address upon such paths. Finally, the return of this bank priority acknowledge to a port the request from which gave rise to same, for example, the return of an acknowledge from BANK 0 PRIORITY 60a to the REQ STACK & CTRL and SP0 DATA STACK 82, does allow of, the issuance of further, subsequent, requests. In the case of the SP ports, such subsequent requests responsive to such acknowledges will issue off the stacks of the SP ports at a period of 30 nanoseconds. The continued communication of each acknowledge, across long cables, to the requestor, the processing of such acknowledge within a requestor, and the return responsively to such acknowledge of a further request is at a timing such that if five successive such requests are stacked, as is exceeded by the 8-deep request stacks for the SP0 and SP1 ports, then such request stacks will not be empty (repetitive SP requests ensuing) even should successive requests be honored from such stacks at a rate of 30 nanoseconds. In attainment of this fastest, 30 nanoseconds, response time to consecutive requests it should be known that each of the storage memory banks, STORAGE MEMORY BANK 0 40a through STORAGE MEMORY BANK 7 40h, has a 90 nanosecond cycle time. Therefore, consecutive requests need reference successive (as will be the case when addressing is incrementally increasing by four), or at least different, ones of the storage memory banks upon each of up to three consecutive subsequent requests if the fastest, 30 nanoseconds, operational rate is to be obtained.

The manner of the prioritized requesting and addressing of eight memory banks, STORAGE MEMORY BANK 0 40a through STORAGE MEMORY BANK 7 40h, having been preliminarily seen in FIG. 1, a further statement upon the time performance of the HPSU is possible. Each of the eight memory banks, STORAGE MEMORY BANK 0 40a through STORAGE MEMORY BANK 7 40h, can each read or write four words each 90 nanoseconds. The total bandpass of all eight such memory modules is thusly 355.55 megawords per second, or 12.8 gigabits per second. When indexing (normally consecutively) through successive ones of the memory banks, each of the SP0 and SP1 data ports can support the reading and/or writing of four words each 30 nanoseconds. This is equivalent to a bandwidth of 133.33 megawords per second for each such port, or 9.6 gigabits per second for both such ports combined. The bandpass to the IOP's, collectively, is in respect of the concurrency of pending requests from plural IOP's, and the time which it takes to communicate the acknowledge of each such request back to the associated IOP and receive, responsively thereto, a next subsequent request. Such numbers of IOP's and times of interface communication limits reading and writing on the collective IOP ports to two words per 120 nanoseconds, or 16.66 megawords per second, or 600 megabits per second. The collective ports of communication to the IP's would exhibit like performance, save only that the block read mode, supported only to the IP's, does enable of the transfer of eight words every 240 nanoseconds, which is equal to 33.33 megawords per second, which is equal to 1.2 gigabits per second for the 36-bit words of the present invention. The total bandpass of the HPSU actually utilizable is thusly 133.33 megawords per second to each of two SP ports, 16.66 megawords per second to the ports of the IOP's collectively, and 33.33 megawords per second to the ports of the IP's collectively; a total 316.66 megawords per second, or 11.4 gigabits per second. The design accommodation visible in FIG. 1 which makes such high performance possible are as follows. The memory is 8-way interleaved: each of the storage memory banks, STORAGE MEMORY BANK 0 40a through STORAGE MEMORY BANK 7 40h, is independently addressable and simultaneously operatable. There is a request (and data and address and function) stack for each of the highest performance SP ports. Such stacks, holding requests 8-deep in the present invention, are primarily useful to requestors which do make ordered references to vast amounts of data, and which do make references to instructions and particularly to branching address references proceeding from such instructions much more seldomly. Such is the nature of array, or vector, processors such as are the SP's supported by the HPSU. Finally, if a large number of requestors, ten in the case of the present invention, are to be granted parallel access to the common memory stores, then it is of utility that the priority determination amongst such should be accomplished at minimum delay to the highest priority, highest speed, channels. This is accomplished in the HPSU shown in the block diagram of FIG. 1 by a 2-level priority determination: a first-level priority determination amongst four IOP's in IOP PRIORITY 52 and amongst four IP's in IP PRIORITY 68, with a second-level, bank, priority determination amongst two SP's, the prioritized IOP, and the prioritized IP in the bank priorities, BANK 0 PRIORITY 60a through BANK 7 PRIORITY 60h. An "odd" address and "even" address pipeline scheme is also employed in bringing the requests and addresses from the stacks of such upon the SP ports expeditiously to the bank priorities. It may thus be realized, parallelism and multiplicity of other resource such as the storage memory banks permitting, that the performance of the present invention to read and to write data each 30 nanoseconds is essentially based on the performance of the priority network, which performance at a 30 nanoseconds pipelined cycle time to two high-speed SP ports is the more remarkable for also according prioritized service to four IOP's and four IP's.

Continuing in FIG. 1, each of the STORAGE MEMORY BANK 0 40a through STORAGE MEMORY BANK 7 40h memory stores contains 512K 36-bit words plus associated parity and error correction code bits. Each of the storage memory banks, STORAGE MEMORY BANK 0 40a through STORAGE MEMORY BANK 7 40h, receives four words (144 bits) plus 17 bits of address from the BANK MULTIPLEXER 60i via respective buses 212a through 212h. Five bits of function code are received from respective bank priority. Each of the memory storage banks, BANK 0 40a through BANK 7 40h, has four output ports—SP0, SP1, IOP, and IP output ports each of which output ports is four words wide. Each of the storage memory banks, STORAGE MEMORY BANK 0 40a through STORAGE MEMORY BANK 7 40h, receives 4 control bits from respective BANK 0 PRIORITY 60a through BANK 7 PRIORITY 60h via respective cables 210a through 210h which 4 control lines code direct the storage memory bank to read or write data to designated one(s) only of the four parallel storage modules combined within each storage memory bank. Four storage modules, designated WORD 0, WORD 1, WORD 2, and WORD 3 storage modules, each containing 131K 36-bit words plus associated parity and error correction bits, are contained within each of the storage memory banks. The entire storage memory bank bit is addressed upon a four-word boundary, and each of the STORAGE MODULEs WORD 0 through WORD 3 therein enabled for the storage of an associated one of the four data words, WD0 to WD3 received from the BANK MULTIPLEXER 60i. In accordance with the type of function being exercised upon the storage memory bank, the signals received from the bank priority will enable that either all four words, the upper two words (WORD 0 and WORD 1), the lower two words (WORD 2 and WORD 3), or an individual one (WORD 0 through WORD 3) of the STORAGE MODULEs will be written with data during a single write operation. The ports SP0, SP1, IOP, and IP occurring on each of the STORAGE MODULEs, WORD 0 through WORD 3, are one data word in width, the combination of four such of each type as appear on STORAGE MODULEs WORD 0 through WORD3 combining to form the total four-word wide data buses of respective type SP0, SP1, IOP, and IP which are illustrated to be the four output ports of each of the storage memory modules shown in FIG. 1.

Each of STORAGE MEMORY BANK 0 40a through STORAGE MEMORY BANK 7 40h has multiple output ports. Respective ones of the multiple output ports are wired-OR interconnected, meaning electrically connected in common upon a bus wherein each signal will be the logical 'OR' function of the concurrent signal drive from all output ports, between plural ones of the storage memory banks. Each of the storage memory banks, STORAGE MEMORY BANK 40a through STORAGE MEMORY BANK 7 40h, receives a two bit code from the respective bank priority, BANK 0 PRIORITY 60a through BANK 7 PRIORITY 60h which two bit code identifies whether the storage memory bank is being requested by SP0, SP1, an IOP, or an IP. The storage memory bank utilizes this two bit code, which may be considered to be transferred on connective paths not shown in FIG. 1 but which are parallel to cables 210a through 210h, to select a corresponding single one output port, the SP0 or SP1 or IOP or IP output port, through which, and onto the wired-OR interconnection bus connected thereto, four words of read data plus associated parity bits will be gated. Each of the eight storage memory banks actually consists of four parallel storage modules each storing one word of data plus associated check and parity bits. It is actually each of these four parallel storage modules which is controlled, in parallel, to gate one word plus associated parity bits onto one wired-OR bus: the four storage modules acting in parallel to gate either four words or two words or one word—as the case may be as established by the word enablements carried on cables 210a–h—always onto but a single one of the SP0, SP1, IOP, or IP wired-OR communication busses. Since the prioritization simultaneously performed in each bank priority, BANK 0 PRIORITY 60a through BANK 7 PRIORITY 60h, is between a maximum of four requests arising from SP0, SP1, the highest priority one IOP, and the highest priority one IP, a maximum of four storage memory banks will be requested/initiated upon any one 30 nanosecond cycle, and will resultantly to such request/initiation simultaneously produce read data some 120 nanoseconds later. Since each of the maximum four requests was from a different type of requestor—a SP0, a SP1, and IOP, or an IP—then one only storage memory bank will be controlled to utilize each wired-OR communication bus at any one time. When the actual communication time on these buses is in the order of 21.5 nanoseconds, each and every one will normally be in use upon each 30 nanosecond pipelined cycle time of the High Performance Storage Unit, meaning that the utilization duty cycle is good and that this dense (8 storage memory banks ×4 storage modules/storage memory bank ×(36 data +4 parity) bits/storage module=1280 bits are communicatable), fast (signal communication time equals 22.5 nanoseconds) distributive (data from a total of eight storage memory banks may be transmitted (upon plural cycles) to a total of four types of HPSU output ports) communication network operating over some distance (approximately one meter) and with some power consumption should incur minimum cost.

Continuing in FIG. 1, the manner of communication from the storage memory banks, STORAGE MEMORY BANK 0 40a through STORAGE MEMORY BANK 7 40h, to those registers 102a through 102d, which registers provide the final output communication from the HPSU to ten requestors of three types, is accomplished by a combination of wired-OR and logical OR selection and enablement of communication interconnection. Commencing with the interface from the four-word wide SP0 port of each of the four memory storage banks to the OR/REG 102a which is the final register and driver interface to bus 204 communicating at a four-word wide data width to SP0, such interface may be observed to be composed of buses 213a and 213b. The SP0 output ports of the zeroeth, second, fourth, and sixth storage memory banks, STORAGE MEMORY BANK 0 40a, STORAGE MEMORY BANK 2 40c, STORAGE MEMORY BANK 4 40e, and STORAGE MEMORY BANK 6 40g, are wired-OR into the single four-word wide bus 213a. Likewise, the SP0 data output port of banks 1, 3, 5, and 7 - STORAGE MEMORY BANK 1, 40b, STORAGE MEMORY BANK 3 40d, STORAGE MEMORY BANK 5 40f, and STORAGE MEMORY BANK 7 40h—are wired-OR into the single four-word wide data bus 213b. The OR/REG 102a for the SP0 interface to the HPSU will receive a gating signal derived from address bit 21 (the even/odd bank selection bit of the address) which was held in SP0 DATA STACK 82, in order by such gating signal to gate the appropriate bus, and four-word wide data quantity received thereupon into OR/REG 102a.

It should be recalled that due to the function of the bank priorities, BANK 0 PRIORITY 60a through BANK 7 PRIORITY 60h, one only of the storage memory banks, STORAGE MEMORY BANK 0 40a through STORAGE MEMORY BANK 7 40h, will be reading a four-word data quantity to the SP0 port at any one time. Thusly, all eight storage memory banks could have been wired-OR in the SP0 port outputs thereof because one only of such storage memory banks are active at any one time. Such totally wired-OR interconnection would be similar to the manner by which such storage memory banks are currently wired-OR by even and odd paths. The reason why a wired-OR interconnect is utilized between four only storage memory banks, and the two wired-OR bus interconnects thereby created between eight banks are then further gated by logical OR means within output registers, is that the physical length of interconnect, and characteristic load impedances, of these buses and of the elements connected thereto dictate that the mode and manner of interconnect should be substantially as shown in economical support of high performance. In point of fact, the OR/REG 102a is physically located midway between the even storage memory banks and the odd storage memory banks, the illustrated combination of two wired-OR buses communicative thereto thereby offering minimum signal communication time if, as is the case, the logical OR function between such two buses 213a and 213b is accomplished within OR/REG 102a at a shorter time than the signal transmission across the finite physical width, and finite impedance, of four storage memory modules. In other words, and in consideration that the HPSU stores 4M 36-bit words, what is under consideration in the area of electrical communication from the storage memory banks, necessarily of physical size, which store such 4M data words to those singular output ports which will communicate four words with a total HPSU pipeline latency (read access time) as low as 240 nanoseconds (although such time obviously includes more than just the time of communication from the storage memory banks to the output registers) is a method of, and apparatus for, wired-OR connection in combination with logic OR connection for, and in support, of high performance. This high performance communication will transpire in 22.5 nanoseconds. Wired-OR interconnection between storage memory modules and output registers is made possible only because each storage memory module does have multiple output ports, and because between all such storage memory modules only one such will emplace read data upon any one port at any one time.

Continuing in FIG. 1 with the explanation of that interconnection structure which is, in aggregate, supportive of the transfer of 11.4 gigabits per second from the storage memory banks, STORAGE MEMORY BANK 0 40a through STORAGE MEMORY BANK 7 40h, to the communication output registers, REGISTERs 102a through 102d, the communication between the SP1 output port of each of the eight storage memory banks to the OR/REG 102b, which is the interface register via four-word wide bus 205 to SP1, is accomplished identically to the manner of communication with SP0 just described. Communication between the IP ports of each of the storage memory banks, STORAGE MEMORY BANK 0 40a through STORAGE MEMORY BANK 7 40h, to the AND/OR/STACK/REG 102d and communication between the IOP port of each of the storage memory banks and the AND-OR/REG 102c is for each likewise but a combination of two wired-OR buses, one of which is connected to the even ones and one of which is connected to the odd ones of the storage memory banks. Each of the buses is further illustrated, however, to be split into a lower and into an upper half, such as is most readily apparent in illustration of lower half buses 214a1 and 214b1, and in the illustration of upper half buses 214a2 and 214b2, in the connection of the IP port of the storage memory banks to AND-OR-STACK/ REG 102d. The lower half bus carries the two words, WORD 0 and WORD 1, which are output of the respective two STORAGE MODULEs of each storage memory bank, whereas the upper half bus carries the two words, WORD 2 and WORD 3, which are outputs of the remaining two STORAGE MODULEs of each storage memory bank. Recall that upon a normal, two-word read to either an IP or an IOP only the WORD 0-WORD 1, or the WORD 2-WORD 3 pair of the STORAGE MODULEs will be enabled, in accordance with the function code received by and interpreted within each of the storage memory banks, for output. Since during a two-word read operation to an IP as controlled by the bank priority, BANK 0 PRIORITY 60a through BANK 7 PRIORITY, only one of the storage memory banks, STORAGE MEMORY BANK 0 40a through STORAGE MEMORY BANK 7 40h, will be reading to an IP at any one time, then one only of the paths 214a1, 214a2, 214b1, and 214b2 will contain valid read information at any one time. Similarly to the way that the gating signal derived from bit 21 of the address held in SP0 DATA STACK 82 was passed to the SP0 output register OR/REG 102a, a gating signal derived from bit 21 of the address held in IP DATA MUX/STACK 72 will be transferred (path not shown in FIG. 2) to the AND-OR-STACK/REG 102d to cause the gating of either those buses 214a1, 214a2 connective to the even storage memory banks or those buses 214b, 214b2 connective to the odd storage memory banks. Furthermore, a second gating signal derived from bit 22 of the address held in the IP DATA MUX/STACK 72 will also be transferred (path not shown in FIG. 1) to the AND-OR-STACK/REG 102d to cause the gating of either the lower two-word pair carried on buses 214a1 and 214b1 or the upper two-word pair carried on buses 214a2 and 214b2.

The AND-OR-STACK/REG 102d also receives additional information (resultantly from the acknowledgement by the bank priorities) from IP PRIORITY 68, which information does permit of the selection of communication with the proper IP, IO0 through IP3. This selection information is derived from the 2-bit port code from IP PRIORITY 68 carried on cable 70 (path of connection to AND-OR-STACK-REG 102d not shown in FIG. 1). Communication of data from the storage memory banks to the AND-OR/REG 102c and subsequent communication to a selected one of IOP0 through IOP3 across buses 206 transpires in an equivalent manner.

Continuing in FIG. 1, there is additional support in the interconnection between the storage memory banks, STORAGE MEMORY BANK 0 40a through STORAGE MEMORY BANK 7 40h, and the AND-OR-STACK/REG 102d (which is the output register to the IP's) by lower buses 214a1, 214b1 and by upper buses 214a2, 214b2 for the special block read function which is capable of being performed (only) to an IP port. During the block read function, two of the storage memory banks are twice simultaneously operative to respectively twice produce a WORD 0-WORD 1 pair and WORD 2-WORD 3 pair in joint constitution of a eight-word data quantity to be read to an IP. Such a eight-word quantity is transmitted by four words upon bus 214a1 and 214b1, and by remaining four words upon bus 214a2 and 214b2, from the selected two memory banks to the AND-OR-STACK/REG 102d. It is because of this function that the word "STACK" appears within the title of AND-OR-STACK/REG 102d: the eight words being held in a stack prior to their issuance, most significant word pair first, by two-word pairs to that IP performing the block read function.

Additionally appearing in FIG. 1 are DC & COMPARE 215 referring to dayclock and comparison circuitry, AUTO TIMER 216 and SYS STATUS 217 which represent additional, miscellaneous functions enabled within the memory. The dayclock and auto timer are loaded from the IP, and show a communication path from such by IP DATA MUX/STACK 72 via bus 74. Additionally, the dayclock of D.C. & COMPARE 215 and the system status register of SYS STATUS 217 may be selectively addressably read to the AND-OR-STACK/REG 102d via respective buses 218 and 219, and then output to the IP interrogating such. These miscellaneous functions, although noted for the sake of completeness, are not integral to the function of the present invention.

E. Timing of the HPSU within which the Circuit Apparatus of the Present Invention Resides The apparatus of a High Performance Storage Unit within which the present invention is contained, the block diagram of which was seen in FIG. 1, supports of the synchronous communication to requestors of, and at, two different interface cycle times. Specifically, the HPSU communicates to one type of requestor, called a Scientific Processor or SP, at a pipelined interface communication cycle time of 30 nanoseconds (within which interface communication cycle four 36-bit data words may be transferred). The HPSU also supports synchronous communication with requestors of a second interface cycle time, requestors identified either as instruction processors or IP's or as input output processors or IOP's, which second interface cycle time is 60 nanoseconds (during each which two 36-bit data words may be transferred). That these two cycle times are in integral relationship to each other (i.e., 2:1) is irrelevant: the only requirement being that there should be a common interval, or clock base, which divides integrally into both such cycle periods. In the HPSU this clock space interval is 7.5 nanoseconds, of which there are four such intervals, or a four-phase clock, in support of the 30 nanosecond interface cycle time and of which there are eight such, or an eight-phase clock, in support of the 60 nanosecond cycle time interface.

Although it is only incidental that the two interface cycle times (60 nanoseconds and 30 nanoseconds) supported are in integral relationship (2:1), it is of greater significance that any HPSU internal function commonly exercised by the requestors of two different interface cycle times, such as the internal read/write cycle time of the storage memory bank is, and can be by definition, in fixed time relationship to one only of the two interface cycle times. The HPSU internal functions are timed by a clock relational to its fastest interface, ergo a four-phase 30 nanosecond clock. (Conversely, it could be said that a 30 nanosecond interface cycle time can exist only because there is an HPSU clock to support such.) Consider, for example, the read/write function of the storage memory banks relative to the four-phase 30 nanosecond clock. Both the read/write cycle time and the access time of the storage memory banks are longer than 30 nanoseconds, ergo in a pipelined organization of the HPSU at a 30 nanosecond period both such read/write cycle time and such access time must be multiples of such 30 nanosecond period. This is indeed the case: the read/ write cycle time of 90 nanoseconds is in 3:1 integral relationship with the 30 nanosecond pipelined HPSU cycle time which is the faster (SP) interface communication cycle time, and the access time of 120 nanoseconds is in 4:1 integral relationship with the 30 nanosecond interface communication cycle time. Most importantly for recognition of the timing complexities required to be solved in the HPSU apparatus, it should be noted that the initiation (upon availibility after each 90 nanosecond read/write cycle time) of any storage memory bank is always at the same phase (actually $\phi 3$) of the four-phase 30 nanosecond clock, and the gating of read data from such storage memory bank (120 nanoseconds later) will also be always at the same phase ($\phi 3$) of the four-phase 30 nanosecond clock.

Now consider the interaction of a second, 60 nanosecond cycle time, communication interface with the functions, such as the internal read/write cycle time of the storage memory banks, of the HPSU exercised of fixed times (phases) relative to the 30 nanosecond clock cycle. It is obvious that HPSU internal functions, such as the read/write cycle time of the storage memory banks, if uniformly initiated relative to the faster, 30 nanosecond, clock cycle (and the next two paragraphs will explain that not to do so is inefficient) will not always occur at the same time, meaning clock phase, relative to the 60 nanosecond interface communication cycle time. For example, the phase of the four-phase 30 nanosecond clock which both gates initiation of the storage memory banks and the gating of read data therefrom (shown respectively as signals E and F in FIG. 2) can occur at either $\phi 3$ or $\phi 7$ of the eight-phase 60 nanosecond,clock, as may be visualized by momentary reference to FIG. 3. Now there is no appreciable problem to synchronizing a request occurring (from an IP or an IOP) upon the slower, 60 nanosecond interface cycle time, communications interface with the faster 30 nanosecond pipelined cycle time of the storage memory banks. But there is a problem in resynchronizing the data read of such storage memory banks with such a slower, 60 nanosecond interface cycle time, communications interface. Incidentally, this problem arises even should such slower interface cycle time be in an integral relationship to the read/write cycle time of the storage memory banks (60 nanoseconds not being in an integral relationship to 90 nanoseconds). The reader may consider the relationship between the phases of a four-phase 30 nanosecond clock and all corresponding phases of a co-incident twelve-phase 90 nanosecond clock, or of a six-phase 45 nanosecond clock, or of a five-phase 52.5 nanosecond clock in order to discern that resynchronization must always occur for simultaneous operation at two different interface communication cycle times.

Figure 2:
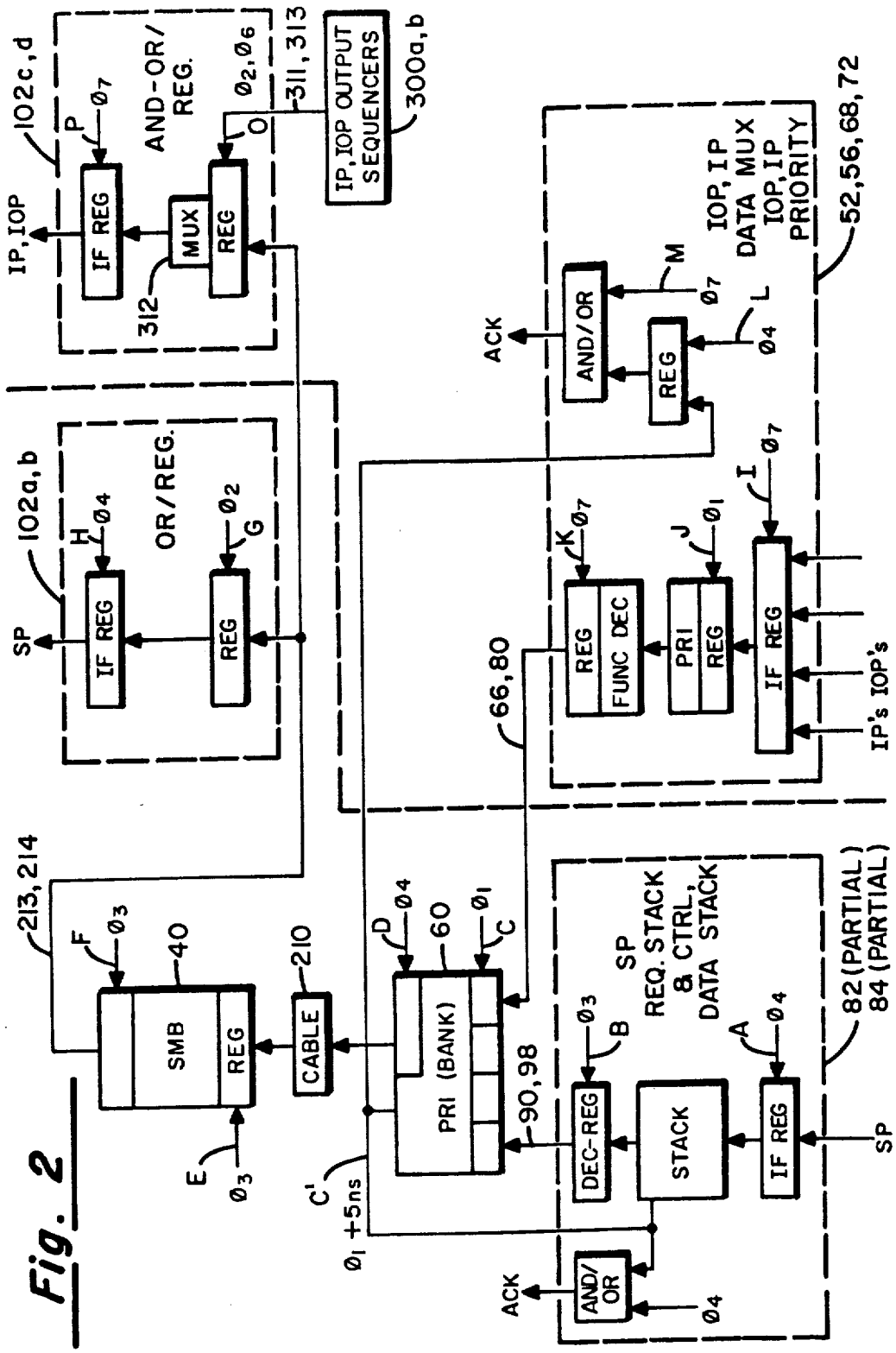
FIG. 2 shows a detailed block diagram of the timing of the HPSU in order that it may interface with requestors of two disparate interface communication cycle times.
Figure 3:
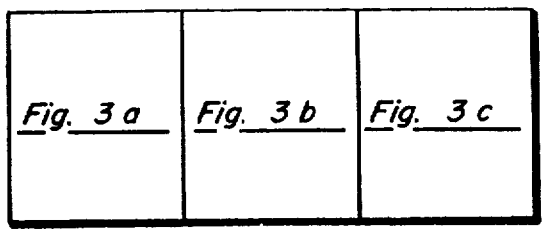
FIG. 3, consisting of FIG. 3a through FIG. 3c shows a timing diagram of the 8-phase and of the 4-phase clocks which are utilized by different types of requestors in communication with the HPSU, and the possible times of occurrence of the initiation of reading the storage memory bank, and of the gating of the results output therefrom such reading, relative to the clock phases of each of the 4-phase and 8-phase clock timing chains.
Figure 3A:
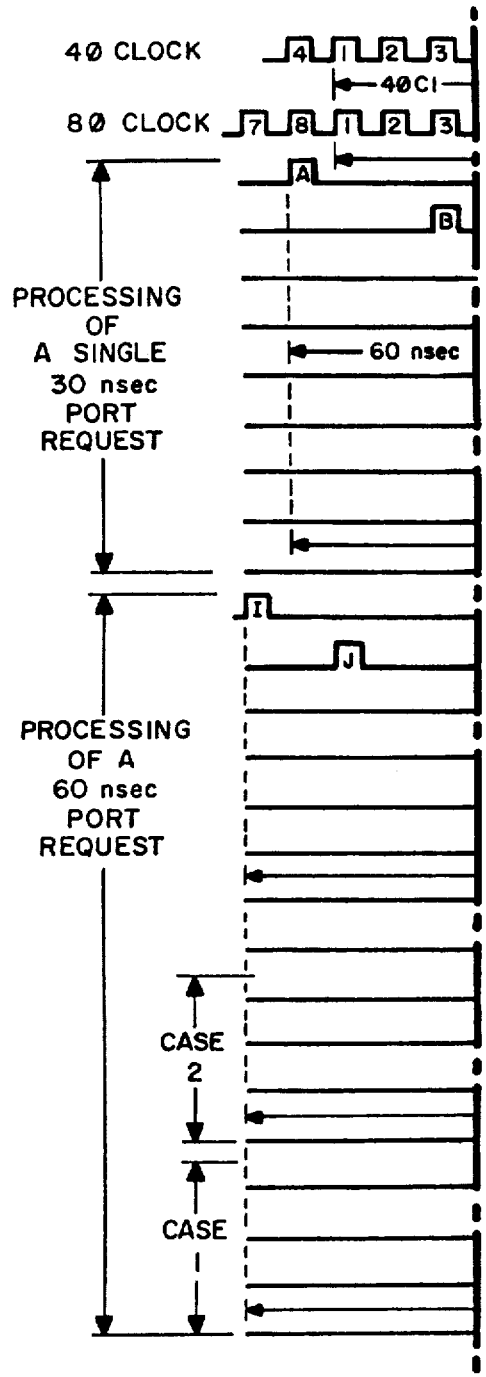
Figure 3B:
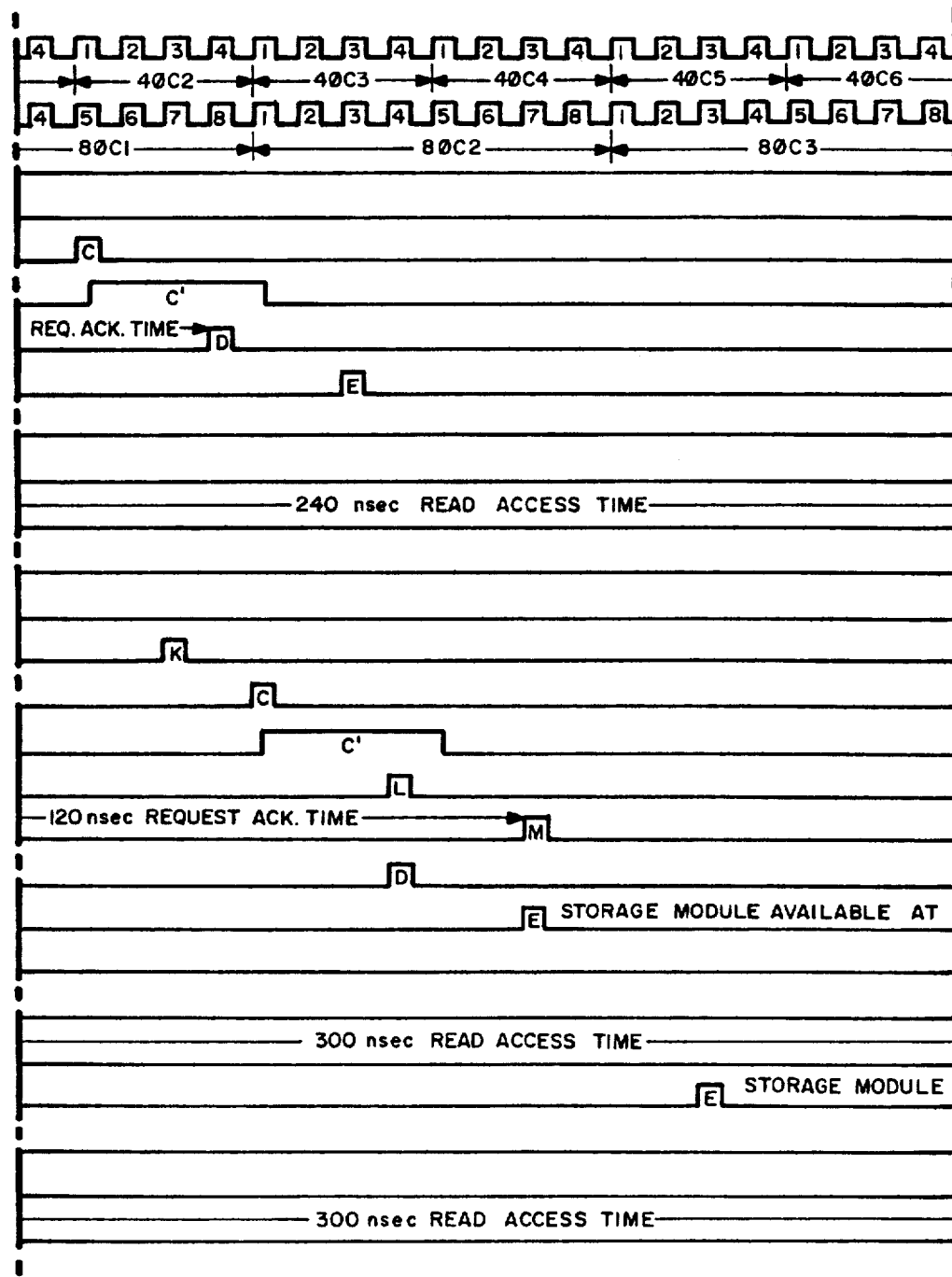
Figure 3C:
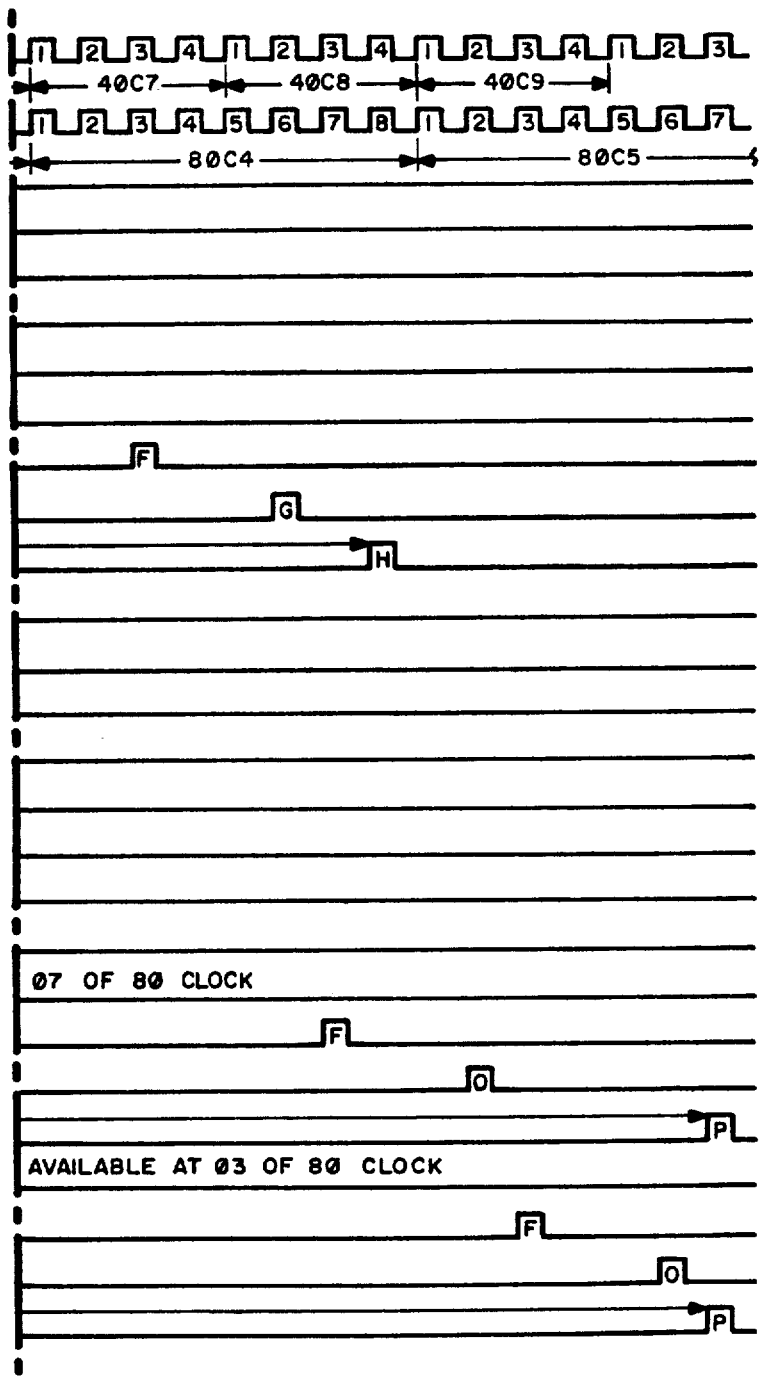

The timing of the High Performance Storage Unit (HPSU) in support of its capability to synchronously communicate with requestors of two different interface cycle times, while simultaneously enabling that the storage memory banks therein the HPSU should not incur read/write cycle time greater than electronically necessary in order merely to support of such interface communication at plural interface cycle times, is shown in FIG. 2. The block diagram of the essential timing of the HPSU is shown in FIG. 3, consisting of FIG. 3a through FIG. 3c. In FIG. 2 all timing to the left of the dashed line is enabled by a clock of period 7.5 nanoseconds, the phases of which are labelled 1 through 4, ergo a 4-phase clock. All timing to the right of the dashed line is enabled by the selfsame coincident and identical clock pulses of phase 7.5 nanoseconds save that such phases are numbered 1 through 8, ergo consititutinng an 8-phase clock. The relationship between the phases of the 4-phase clock and those of the 8-phase clock, which are seen to be the identical clock save only for the designation of the phases, is seen within the timing diagram of FIG. 3. The 4-phase clock supports of a 30 nanosecond communications cycle time synchronous interface to the Scientific Processor, or SP, the input signals from which SP may be seen at the bottom, and the output signals to which SP may be seen at the top, of that area to the left of the dashed line. The 8-phase clock supports a 60 nanosecond communications cycle time synchronous interface to the Instruction Processors or IP's and to also the Input/Output Processors or IOP's, the input signals from which are seen at the bottom, and the output signals to which are seen at the top, of that area to the right of the dashed line within FIG. 2.

Continuing in FIG. 2, the REQ STACK & CNTRL 82 (partial), 84 (partial) shown therein was previously shown in FIG. 1 to receive the request, address, data and function from both SP0 and SP1. Such is clocked into the IF REG within the REQ STACK & CTRL 82 (partial), 84 (partial) by clock $\phi 4$. Likewise, considering to the right of the dashed line the IOP, IP DATA MUX IOP, IP PRIORITY 52, 54, 68, 72, also previously seen in FIG. 1, receives the request, address, data, function, and start/end information from the IP's and IOP's. This information is clocked into the interface register IF/REG by clock $\phi 7$ of the 8-phase clock. The requests received of the SP's, clocked at $\phi 4$ of the 4-phase clock, and those received of the IP's and IOP's, clocked at $\phi 7$ of the 8-phase clock (which clock times are not identical) must first be brought into synchronization at a common priority network. Thusly, the first problem encountered is merely being able to synchronize those request signals received from the SP via cables 90, 98 with those received of the IP's and IOP's received via cables 60, 80 at the PRI (BANK) 60, which is the common bank priority network. This synchronization is very simple, almost trivial. Consider that all requestors are gated into bank priority PRI (BANK) 60 upon clock $\phi 1$ of the 4-phase clock. Within the IOP, IP DATA MUX IOP, IP PRIORITY 52, 54, 68, 72 the requests from the IP's and IOP's which were clocked into the IF REG thereof on clock $\phi 7$ of the 8-phase clock are subsequently clocked through the first-level priority consisting of PRI and REG during clock $\phi 1$ of the 8-phase clock and finally into the function decoder ending at a register FUNC DEC and REG upon the clock $\phi 7$ (of the 8-phase clock) of the next subsequent cycle. All such clocked timing, as is the two clock phases (15 nanoseconds) allowed for transmission upon cables 66, 80, is taken in consideration of the delays incurred within, and between, the associated circuit elements. Likewise considering the SP REQ STACK & CTRL, DATA STACK 82 (partial), 84 (partial), the requests received of the SP's which were clocked into the IF REG interface register therein upon clock $\phi 4$ of the 4-phase clock are entered into the STACK. Earliest requests leaving the STACK are clocked into the decoder and register DEC-REG upon clock $\phi 3$ (of the 4-phase clock) of the next subsequent cycle. Referring to the pulse trains of the 4$\phi$ CLOCK and 8$\phi$ CLOCK shown within the timing diagram of FIG. 3, 15 nanoseconds have been allocated for the transmission of the request signals via cables 90, 98 to the bank priority PRI (BANK) 60. It will be noted that in consideration of the differing circuitry which does handle and stack the requests of the SP's, as compared to the first-level priority determination which does transpire upon the request of the IP's and IOP's, the elapsed time until a single request received of an SP, or one received of an IP or IOP, is received at the bank priority PRI (BANK) 60 is different. This says nothing more than that the latency of the memory response to a request of an IP or an IOP will be greater than that latency of response to a SP request. In fact, the minimum elapsed time upon which a request received of an IP or IOP may be recognized at bank priority is ten clock phases or 75 nanoseconds, whereas the minimum elapsed time upon which a request received of the SP may be recognized at the same bank priority is five clock phases or 27.5 nanoseconds. The HPSU is, of course, pipelined, and the bank priority PRI (BANK) 60 is clocked upon each clock $\phi 1$ occurrence of the 4-phase clock.

Continuing in FIG. 2 it may be noted that the bank priority PRI (BANK) 60 does select, in consideration of the availability of the associated memory module, from amongst the four possible types of requestors competing at this level (SP0, SP1, a first-level prioritized IOP, and a first-level prioritized IP) the highest priority one requestor extremely quickly, returning an acknowledge signal C' to that single requestor which wins bank priority at time $\phi 1+5$ ns, or only 5 nanoseconds after the bank priority was gated upon the occurrence of $\phi 1$ of the 4-phase clock. If returned to the SP REQ STACK & CTRL, DATA STACK 82 (partial), 84 (partial), this acknowledge signal permits of the read of a next request from the STACK, and the much later gating of this bank-priority-winning condition by clock $\phi 4$ of the 4-phase clock in the AND/OR element to send the ACK acknowledge signal across the interface to the SP requestor. Similarly, if the signal C' at $\phi 1+5$ ns is routed to IOP, IP DATA MUX IOP, IP priority 52, 54, 68, 72 upon the winning of bank priority by such then it is first gated into a REG therein by the occurrence of $\phi 4$ of the 8-phase clock. The acknowledge signal C' at $\phi + 5$ ns is thereafter gated in element AND/OR upon the interface to the priority-winning IOP or IP as the acknowledgement signal ACK by the occurrence of $\phi 7$ of the 8-phase clock. The bank priority PRI (BANK) 60 produces and gates upon clock $\phi 4$ of the 4-phase clock those control signals which are distributed via cables 211 to BANK MULTIPLEXOR 60$i$ (shown in FIG. 1) and via cable 210 to the storage memory bank SMB 40 (shown in FIG. 1 as STORAGE MEMORY BANK 0 40$a$ through STORAGE MEMORY BANK 7 40$h$). Note that three clock phases of time have elapsed within the second-level, bank, priority network. The path of CABLE 210 is clearly labelled as CABLE in order that the significant time spent in signal propagation thereupon may be more clearly recognized, such time as allows the clocking upon $\phi 3$ of the 4-phase clock the control signals carried thereon CABLE 210 into the REG receipt register of the storage memory bank SMB 40.

Continuing in FIG. 2, it is a fixed characteristic of the storage memory bank SMB 40 that each such operates at a 120 nanoseconds access time. Thusly, that $\phi 3$ of the 4-phase clock shown in the output thereof such SMB 40 is that $\phi 3$ upon the fourth following complete cycle of the 4-phase clock to that $\phi 3$ which did gate the input REG to such SMB 40. The fixed, 120 nanosecond, access time of the storage memory banks presents no problem to the SP interfaces which operate upon a 30 nanosecond interface cycle time. Again allowing three clock phases for receipt of signals transmitted from the (necessarily) physically dispersed modules of the storage memory banks, such signals are recovered via cable 213, 214 into REG of OR/REG 102 $a,b$ upon the occurrence of clock $\phi 2$ of the 4-phase clock. Such data is subsequently transferred to the interface register IF REG structure within the OR/REG 102$a,b$ upon the occurrence of clock $\phi 4$ of the 4-phase clock, and transferred to the SP upon this time which is equal to that clock phase upon which the request from the SP was initially gated, and which represents an integral number of SP interface cycle times of delay therefrom (actually 8 complete cycles equalling a 240 nanosecond read access time).

The problem of recovering the data output of the fixed 90 nanosecond cycle time storage memory banks to the interfaces of 60 nanosecond cycle time for the IP and IOP is more severe. It may be readily understood that since 60 nanoseconds is not an integral fraction of 90 nanoseconds (90 nancseconds is not an integral multiple of 60 nanoseconds), then that clock phase upon which the storage memory bank SMB 40 does both initiate, and does some 90 nanoseconds later start a next subsequent read/write cycle if a request is present, cannot always be in identical relationship to a set phase of the 8-phase clock, such as $\phi 7$ of the 8-phase clock which gates the requests from the IP's and IOP's. For example, referring to FIG. 3, signal E shown therein is the signal, High-going when true, which is coincident with $\phi 3$ of the 4-phase clock to both initiate the storage memory bank and to start a next subsequent storage module cycle 90 nanoseconds from the previous initiation. It may be noted that while the occurrence of this signal for the first case of storage module availability within the timing diagram of FIG. 3 is coincident with $\phi 7$ of the 8-phase clock, the occurrence of this signal at a separation of 90 nanoseconds is coincident with storage module availability at $\phi 3$ of the 8-phase clock. If the output of the storage memory bank SMB 40 as carried upon cables 213, 214 is to be gated into the receiving REG of AND-OR/REG. 102$c,d$ upon the fourth clock phase following such output availability, then said gating will be at either time $\phi 2$ or at time $\phi 6$ of the 8-phase clock. Reference signal O, High-going when true, shown in FIG. 3 which is intended to illustrate, at respective times $\phi 2$ and $\phi 6$ the 4-phase clock, the gating into REG of the AND-OR/REG. 102$c,d$ (shown in FIG. 2) of that data output from the storage memory bank. Returning momentarily to FIG. 2, the data from the memory recovered into REG of the AND-OR/REG. 102$c,d$ upon either $\phi 2$ or $\phi 6$ of the 8-phase clock is held therein until being multiplexed in MUX to the IF REG, wherein it is gated upon the occurrence of $\phi 7$ of the 8-phase clock, for communication to the appropriate IP or IOP.

The gating signals A through P which are shown in FIG. 2 are again shown in the timing diagram of FIG. 3. The progress of (1) a single request from an SP requestor upon the 30 nanosecond interface communication cycle time interface, (2) a request arising at an IOP or IP requestor upon the 60 nanosecond interface communication cycle time interface which request does, in the first case, find the memory storage module available at $\phi 3$ of the 8-phase clock, and (3) a similar request arising at an IOP or IP requestor upon the 60 nanosecond interface which request does, in the second case, find the memory storage module available at $\phi 7$ of the 8-phase clock, are all shown in FIG. 3. It should be remembered that the HPSU is pipelined at a 4-phase, 30 nanosecond, clock rate and that all gating signals, enabling conditions such as storage memory bank availability permitting, will be repeated many times during the nine successive cycles of the 4-phase clock (almost five successive cycles of the 8-phase clock) shown in FIG. 3. The progress of but single requests is illustrated for clarity. The phase of occurrence of all signals A through P may be observed to be in accordance with FIG. 2. Furthermore, the 60 nanosecond request acknowledge time (REQ. ACK TIME) and the 240 nanosecond READ ACCESS TIME may be observed for the SP interface ports. The 120 nanosecond REQUEST ACK. TIME to IOP or IP port requests may be observed, and it may be noted that the READ ACCESS TIME of such IOP or IP ports is invariant at 300 nanoseconds regardless of whether the case I or case II condition holds true concerning the availability of the memory storage module relative to the gating of the read request from the IOP or IP ports.

Returning to FIG. 2, the choice of either $\phi2$ or $\phi6$ of the 8-phase clock and the application thereof to the entrance register REG of the AND-OR/REG. 102c,d is that resynchronization operation which is crucial to the operation of the HPSU to communicate with a class of requestors (the IP's and IOP's) which have an interface cycle time (60 nanoseconds) which is not equal to the interface cycle time (30 nanoseconds) of another class of requestors (the SP's). Most notably, the timely recovery of the data results of the storage memory bank SMB 40 into the REG of the AND-OR/REG. 102c,d will free the storage memory bank to the further service of other requestors, additional pending IP and IOP requests, and, most particularly, the (most often) voluminous requests of the SP's. Note that no resynchronization problem exists with the 30 nanosecond interface of the SP's, each data result produced by the storage memory bank SMB 40 always being at a fixed time, $\phi3$ of the 4-phase clock, relative to the 4-phase, 30 nanosecond, cycle time of the SP interface. That the results of the storage memory bank SMB 40 will be immediately recovered to the AND-OR/REG. 102c,d and resynchronized therein for communication across the IP and IOP interfaces prevents that such should have to be stored upon the output of the storage memory banks, clogging such storage memory banks and under-utilizing the full potential operational bandwidth of such storage memory banks. Inefficiency would be the result if the cycle time of the storage memory banks had been moved to 120 nanoseconds and the storage module always started concurrently with $\phi7$ of the 8-phase clock, thereby totally eliminating any resynchronization problem but, as the price of such elimination, incurring a one-third increase in the performance speed of the storage memory modules. This one-third increase would inefficiently rebound to the utilization of same by the SP interface ports which, as has been seen, require no resynchronization to fully and effectively utilize the 90 nanosecond read-write cycle time of the storage memory banks. Optimization of the performance of the storage memory banks SMB 40 within the HPSU is causitive of the resynchronization solution to the gating of the read data to the IP and IOP interfaces. The further teaching of such resynchronization solution, which teaching is not essential to the understanding of the present invention, is contained in U.S. patent application Ser. No. 596,214 for a MULTIPLE OUTPUT PORT STORAGE MODULE to Scheuneman et al., the contents of which application are incorporated herein by reference.

F. The Circuit Apparatus of the Present Invention

The present invention is a circuit modifying the snapshot priority network prioritizing a plurality of requestors to a memory unit in order that two such requestors may share a single prioritized memory port. To "share" a memory port means that requests from either, or from both, such requestors will be registered as the request of one only requestor, on one only port, into the snapshot priority determination network. When the priority of such single port becomes uppermost, being serviced by the memory, then either or both of the requestors sharing such port will be "sequentially" served. If either one of the two requestors sharing a single memory port had been active, then it will be served. If both such requestors sharing a single memory port have been active, then both will be sequentially served.

Figure 4B:
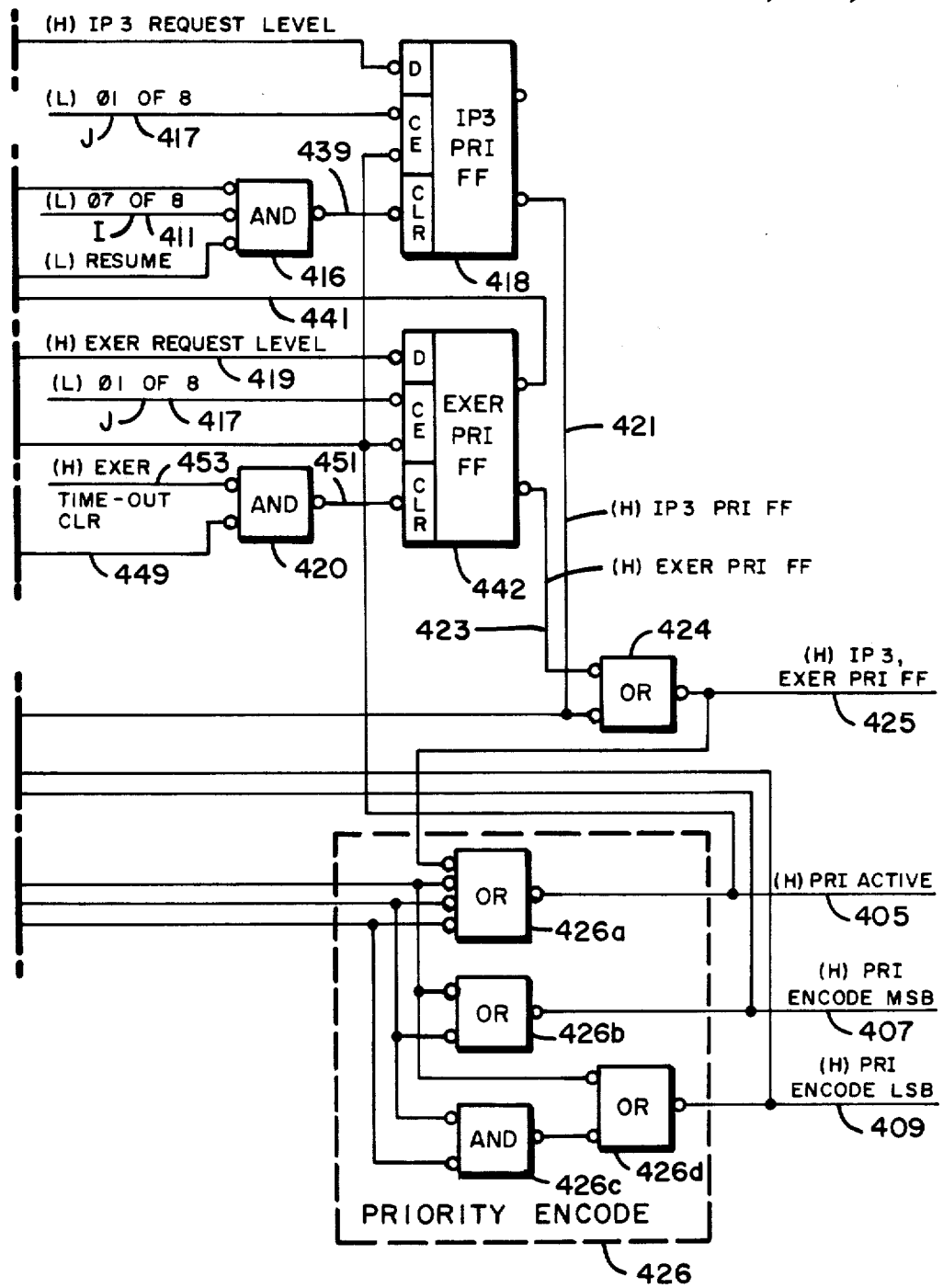
FIG. 4, consisting of FIG. 4a and FIG. 4b, shows the circuit schematic of the present invention modifying snapshot priority in order to enable two requestors to share a single memory port.

Particularly in the preferred embodiment of the present invention, the two requestors which do share a single memory port are an external instruction processor, called IP3, and an internal maintenance processor, called MAINTENANCE EXERCISER, to the memory unit. It matters not that one such unit is internal, and one external, nor that one of such units is, particularly, involved primarily in the performance of a maintenance function. As will be seen from the following explanation, both such requestor units do make normal reading and writing requests of memory, and are both fully enabled for participation in priority through their shared single memory port. The circuit of the present invention is shown in FIG. 4, consisting of FIG. 4a and FIG. 4b. This circuit may be considered to be part of IP PRIORITY 68, previously seen in the block diagram of FIG. 1, although when shown therein only the memory requests of instruction processor 3 appeared as signal IP3 REQ on cable 203a while the request of memory from the internal maintenance exerciser was not shown within such high-level block diagram. The signal IP3 REQ part of cable of 203a shown in FIG. 1b is again shown as signal (H) IP3 REQUEST on line 203a (partial) in FIG. 4a. The request of the maintenance exerciser is shown as signal (H) EXER REQ on line 401 within FIG. 4a.

Continuing to relate the circuit of the present invention shown in FIG. 4 to the function of the larger high performance storage unit memory apparatus of which it is a part, and particularly to the IP3 PRIORITY 68 (shown in FIG. 1a) thereof such memory unit, it will be recalled that the acknowledge signal from the PRI (BANK) 60 (shown in FIG. 2) was returned as signal C' at time $\phi1+5$ ns to the IOP, IP DATA MUX IOP, IP PRIORITY 52, 56, 68, 72 (shown in FIG. 2) to acknowledge the acceptance of a first-level prioritized request by the second-level, storage memory bank, priority. For the purposes of the present invention that this acknowledge is from a second-level priority determination, and that it is within such level associated with the numbers of storage memory banks is irrelevant. The acknowledgement signal returned on line C' to IOP, IP DATA MUX IOP, IP PRIORITY 52, 56, 68, 72, and particularly to IP PRIORITY 68 (shown in isolation in FIG. 1b) as a part thereof, may be considered to simply mean that the storage unit has accepted, and will act upon by reading or writing as directed, the currently uppermost prioritized request. Such an acknowledge signal, which will release the first-level, snapshot, priority network to present a next highest priority one request, or if all such requests have been presented to perform a new priority snap, is shown as signal (H) ACKNOWLEDGE on line 403 in FIG. 4a. Thus the circuit of the present invention shown in FIG. 4 may be considered to be a priority circuit operating intermediary requests received from two requestors as signal (H) IP3 REQUEST on line 203a (partial) and signal (H)

EXER REQ on line 401, and the acknowledgement to the prioritization of such requests received as signal (H) ACKNOWLEDGE on line 403.

The operation of the circuit of the present invention shown in FIG. 4 is as follows. The goal of the circuit is the production within PRIORITY ENCODE 426 of the High condition of signal (H) PRI ACTIVE on line 405, indicating to successor circuitry that a prioritized request is pending, and the additional production of signals (H) PRI ENCODE MSB on line 407 and signal (H) PRI ENCODE LSB on line 409, which two signals do.indicate if. both are High that the uppermost prioritized one signal is that associated with port 3, the port shared between Instruction Processor 3 and the maintenance exerciser. It is further the goal of the present circuit that such signals should be maintained, and that port 3 should remain uppermost in priority, until first the Instruction Processor 3 (IP3) and the maintenance exerciser have been sequentially acknowledged. This is another expression of what it means to "share" a port: two requestors will be serviced upon the prioritization of both, jointly, as a single prioritized request (such as originates within the preferred embodiment of the invention from port 3).

Tracing the operation of the circuit of the present invention shown in FIG. 4, the request of Instruction Processor 3 arising on the external interface to the High Performance Storage Unit is clocked as the true, or High, signal (H) IP3 REQUEST on line 203a (partial) to set flip-flop IP3 REQ LEVEL FF 402 upon the Low occurrence of clock phase 7, signal (L) φ7 OF 8 on line 411. Similarly, the internal exerciser request of memory arising as true, High, signal (H) EXER REQ on line 401 is clocked by the same low signal (L) φ7 OF 8 on line 411 to set the flip-flop EXER REQ LEVEL FF 404. The set side of the flip-flop IP3 REQ LEVEL FF 402, High when an IP3 request is registered, is clocked as High signal (H) IP3 REQUEST LEVEL on line 413 to set the IP3 priority flip-flop IP3 PRI FF 418 upon the true, Low, occurrence of clock phase 1 as signal (L) φ1 OF 8 on line 417. The pertinent Low-going occurrence of this timing signal (L) φ1 OF 8 on line 417 at time J is also illustrated in FIG. 2. The clocking of the IP3 priority flip-flop IP3 PRI FF 418 is also dependent upon the Low condition of signal (H) PRI ACTIVE on line 405, such Low condition as indicates that no current instruction processor or maintenance exerciser request is prioritized, and that a next subsequent priority snap is enabled. In a like manner, the set side signal output of flip-flop EXER REQ LEVEL FF 402, High when an exerciser request is pending, is gated as High signal (H) EXER REQUEST LEVEL on line 419 to set the exerciser priority flip-flop EXER PRI FF 422 during the Low condition of signal (H) PRI ACTIVE on line 405 and the occurrence of clock phase 1 at time J as Low signal (L) φ1 OF 8 on line 417.

Continuing in FIG. 4, the set side signal outputs of the Instruction Processor 3 priority flip-flop IP3 PRI FF 418, and the corresponding set side signal output of the maintenance exerciser priority flip-flop EXER PRI FF 422 are respectively gated as signals (H) IP3 PRI FF on line 421 and (H) EXER PRI FF on line 423 to OR gate 424, wherein the true, or High, occurrence of either signal will produce High signal (H) IP3, EXER PRI FF on line 425. This signal (H) IP3, EXER PRI FF on line 425, High if the request of Instruction Processor 3 or the Maintenance Exerciser or both are pending, is received at PRIORITY ENCODE 426 along with signals (H) IP0 PRI FF on line 427, (H) IP1 PRI FF on line 429, and (H) IP2 PRI FF on line 431. These signals representing the condition of the priority flip-flops associated with Instruction Processor 0 through Instruction Processor 2 (not shown in FIG. 4) are developed in an exact equivalent manner to the manner by which signal (H) IP3 PRI FF on line 421 and/or signal (H) EXER PRI FF on line 423 were developed responsively to requests of Instruction Processor 3 or of the Maintenance Exerciser. The PRIORITY ENCODE circuit 426, consisting of OR gates 426a, 426b, and 426d plus AND gate 426c, is merely an encoding network receiving four prioritized signal inputs, and producing as binary encoded signal outputs representative of the highest priority one of such four signals the signals (H) PRI ENCODE MSB on line 407 and (H) PRI ENCODE LSB on line 409. Additionally, the PRIORITY ENCODE circuit 426 does, in the element of OR gate 426a, produce signal (H) PRI ACTIVE on line 405 to be High so long as any of the four received signals are High, indicating that a request arising upon one of the four ports is still unacknowledged, and pending in priority.

In illustration of the operation of PRIORITY ENCODE circuit 426, if signals (H) IP0 PRI FF on line 427 plus (H) IP1 PRI FF on line 429 plus (H) IP2 PRI FF on line 431 are all Low, indicating that no requests either were, or remain, pending, from such associated requestors Instruction Processor 0 through Instruction Processor 2, while signal (H) IP3 EXER PRI FF on line 425 is High, indicating that either or both of the Instruction Processor 3 or exerciser request is pending, then signal (H) PRI ENCODE MSB on line 407 and signal (H) PRI ENCODE LSB on line 409 will both be High, indicating that port 3, the shared port, is prioritized. The igh occurrence of these signals (H) PRI ENCODE MSB on line 407 and (H) PRI ENCODE LSB on line 409 as received at decoder 2 TO 4 DECODE 406, during the continuing enablement resultant from high signal (H) PRI ACTIVE on line 405, will produce low signal (L) IP3 PRI RANK 2 on line 433 to be output therefrom such decoder circuit. Meanwhile, responsively to signal (H) PRI ACTIVE on line 405, a prioritized request has been made to read or to write the memory. As may be recalled by momentary reference to FIG. 2, the actual receipt of this request is within the second-level bank priority, shown as PRI (BANK) 60. Also by reference to FIG. 2, it needs be recalled that the acknowledgement of this request, whether such acknowledgement be derived from a second-level priority or (as any alternative embodiment to those logics with which the present invention) from the storage memory banks themselves, is received as an acknowledge signal at time C' at φ plus 5 nanoseconds, such acknowledge signal being shown as signal (H) ACKNOWLEDGE on line 403 in FIG. 4a. This High signal (H) ACKNOWLEDGE on line 403, which may be seen within both the timing diagram of FIG. 3b and FIG. 5b to exist from phase 1 to phase 5 of the 8-phase clock, is clocked to set the resume flip-flop RESUME FF 408 upon the Low occurrence of clock signal (L) φ OF 8 on line 435. Upon the occurrence cf such an acknowledge signal, the clear side signal output of such resume flip-flop RESUME FF 408 occurring as signal (L) RESUME on line 437 will be Low from clock phase 4 to the next ensuing clock phase 4. The Low occurrence of this signal (L) RESUME on line 437 in conjunction with the low condition of signal (L) IP3 PRI RANK 2 on line 433 does satisfy AND gate 416 during the Low occurrence of clock phase 7 signal (L) φ7 OF 8 on line 411 occurring at time I (reference FIG. 5b). The High signal output on line 439 resultant from the satisfaction of such AND gate 416 does clear the Instruction Processor 3 priority flip-flop IP3 PRI FF 418. Thusly has a request of memory arising from Instruction Processor 3 been recognized upon a priority snap, then prioritized and issued to the next higher priority level (on the way to the storage memory banks), and is finally cleared from priority having been accepted and acknowledged.

Continuing in FIG. 4, the now clear condition of the Instruction Processor 3 priority flip-flop IP3 PRI FF does produce Low signal (H) IP3 PRIFF received at AND gate 414. During the Low continuance of signal (L) EXER PRI FF on line 441, indicating that a request from the Maintenance Exerciser is still pending in priority, such AND gate 414 satisfied for the first time, producing High signal (H) ENCODE EXER SELECT on line 443. This signal is clocked by clock phase 3 occurring as Low signal (L) φ3 OF 8 on line 445 to set the Maintenance Exerciser priority flip-flop rank 2 EXER PRI FF RANK 2 412. The resultant low signal output therefrom the clear side of such flip-flop is communicated as signal (L) EXER PRI FF RANK 2 on line 447 to AND gate 410. Meanwhile, the second-level priority (in the direction toward the storage memory banks) does next subsequently respond to the continuing High condition of signal (H) PRI ACTIVE on line 405 by acknowledging same with the High occurrence of signal (H) ACKNOWLEDGE on line 403. This signal (H) ACKNOWLEDGE on line 403, the timing of which is from clock phase 1 to clock phase 5 of the 8-phase clock, is gated to set the resumed flip-flop RESUME FF 408 by the occurrence of clock phase 4 as low signal (L) φ4 OF 8 on line 435. The Low signal output thereof the clear side of such flip-flop does now satisfy AND gate 410 upon the occurrence of clock phase 7 as signal (L) φ7 OF 8 on line 411. The High signal output therefrom such AND gate 410 does satisfy OR gate 420, producing a High signal output therefrom on line 451 which does clear the Maintenance Exerciser priority flip-flop EXER PRI FF 422. The signal (H) EXER TIME-OUT CLR on line 453 also received at OR gate 420 represents a second, alternative and abnormal, means of clearing the Maintenance Exerciser priority flip-flop in the event that the next stage priority and memory unit has timed-out, meaning not responded, to the request thereof such Maintenance Exerciser. The management of such signal (H) EXER TIME-OUT CLR on line 453 is taught in the related patent application U.S. Ser. No. 630,140 entitled "Forced Clear of a Memory Time-Out to a Maintenance Exerciser". For the purposes of the present invention, such signal (H) EXER TIME-OUT CLR on line 453 may be considered to be perpetually Low.

Continuing in FIG. 4, it may be noted that during such time as signals (H) PRI ENCODE MSB on line 407 and signal (H) PRI ENCODE LSB on line 409 were both High, indicating the prioritization of the single (third) port shared by Instruction Processor 3 and the Maintenance Exerciser, the signal (H) ENCODE EXER SELECT on line 443 did announce to any further priority circuits whether the Instruction Processor 3 or the exerciser had control of priority. When both the Instruction Processor 3 and the Maintenance Exerciser have been in sequence acknowledged, then the cleared condition of flip-flip IP3 PRI FF 418 producing Low signal (H) IP3 PRI FF on line 421, and the clear condition of flip-flop EXER PRI FF 422 producing Low signal (H) EXER PRI FF on line 423 will, signals (H) IP0 PRI FF on line 427 through (H) IP2 PRI FF on line 431 remaining Low for either having ever been raised or having been priorly prioritized and acknowledged, enable PRIORITY ENCODE 426 to produce ow signal (H) PRI ACTIVE on line 405, indicating that all pending prioritized requests have been serviced. The low occurrence of such Low signal (H) PRI ACTIVE on line 405 does enable the gating of the priority flip-flops, including IP3 PRI FF 418 and EXER PRI FF 422, upon the next subsequent occurrence of clock phase 1. Thus the circuit of the present invention shown in FIG. 4 has acted to receive the requests of two requestors, prioritizing either or both to be jointly identified as a request upon a single memory port, nominally port 3. When the request upon such port 3 becomes upermost in a snapshot priority scheme, and is acknowledged, then the circuit of the present invention does assure that such acknowledgement is applied either to the first requestor, nominally Instruction Processor 3, or the second requestor, nominally a Maintenance Exerciser, which do share such single prioritized port. If both requestors sharing such port are simultaneously active in requesting memory, the circuit of the present invention will act so that first one, nominally the Instruction Processor 3, and then the other, nominally the Maintenance Exerciser, will be sequentially serviced while the requests of the single port, nominally identified as port 3, is held constant in the snapshot priority. Although a small modification to a normal snapshot priority scheme, the circuit of the present invention does afford some benefit when, as previously explained, either the width of the existing snapshot priority determination circuit is limited (e.g., such width is limited to four ports within the preferred embodiment of the present invention) and/or it is desired to maintain such snapshot priority determination network to be rapidly operative. For example, it may be noted that the delay of PRIORITY ENCODE circuit 426 shown in FIG. 4 is minimal compared, for example, to the prioritization of a single highest one of five input signals.

G. Timing Diagram of the Operation of the Present Invention

Figure 5A:
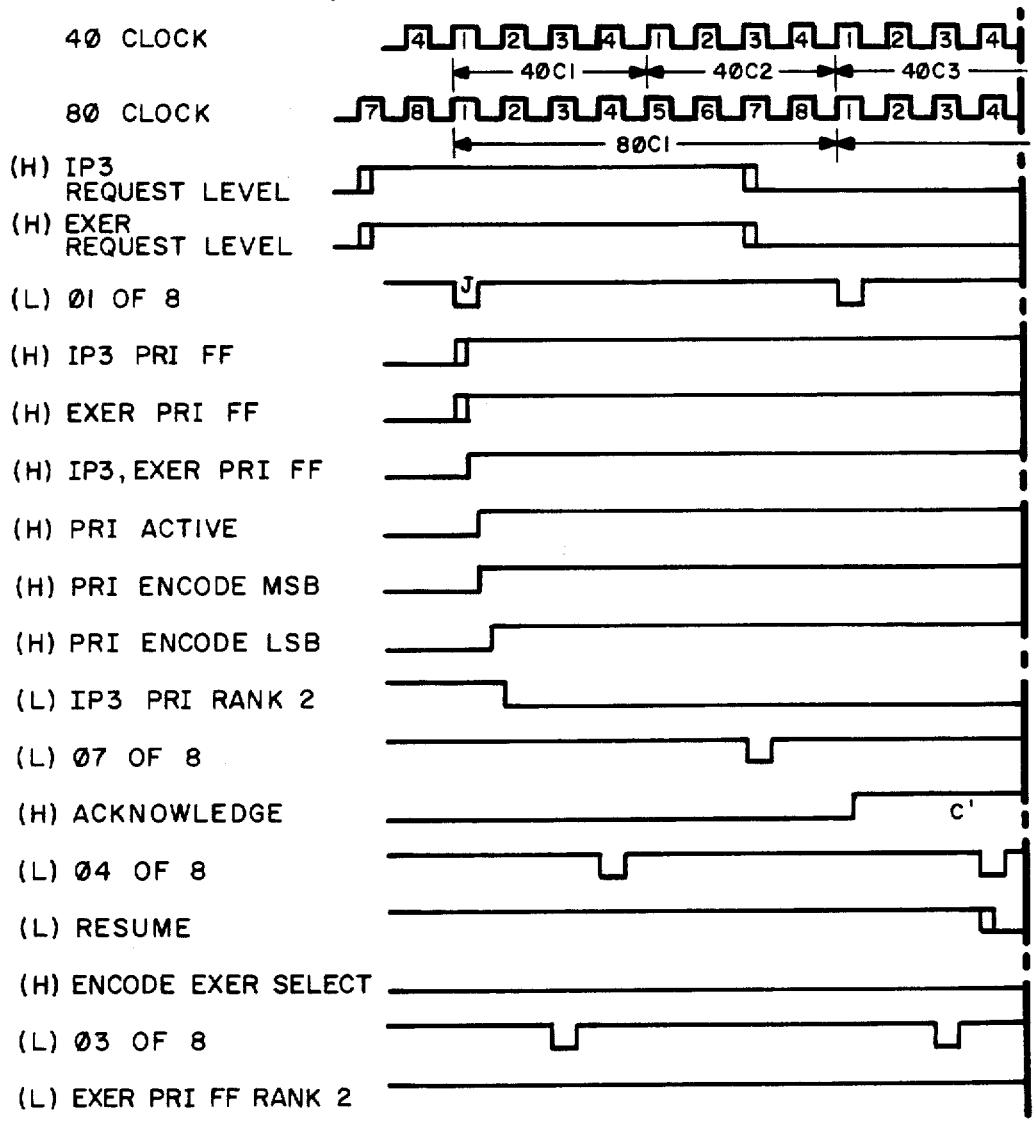
FIG. 5, consisting of FIG. 5a and FIG. 5b, shows a timing diagram of the operation of the circuit of the present invention shown in FIG. 4.
Figure 5:
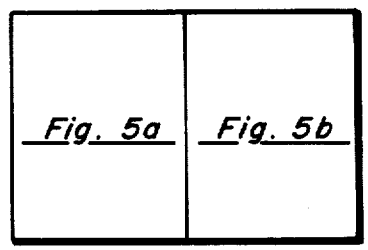
Figure 5B:
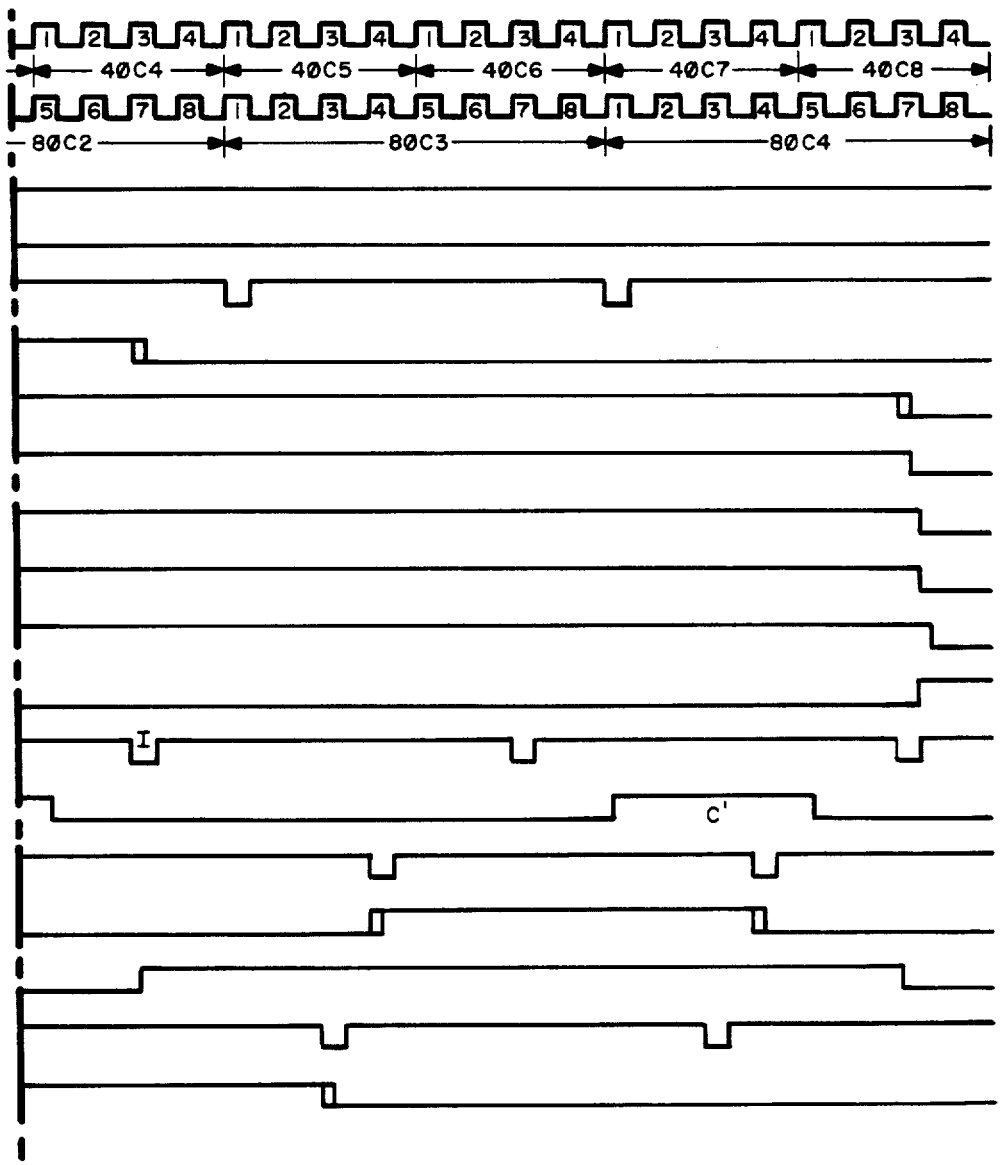

The timing of the present invention of modified snapshot priority enabling two requestors to share a single memory port is shown in FIG. 5, consisting of FIG. 5a and FIG. 5b. The timing is enabled by clock pulses of period 7.5 nanoseconds which pulses are numbered 1 through 8, ergo constituting an 8-phase clock shown as line 8Φ CLOCK. Of reference primarily to related patent applications, these clock pulses of duration 7.5 nanoseconds are the selfsame coincident and identical clock pulses to those pulses labeled 1 through 4, ergo constituting a 4-phase clock, shown as line 4Φ CLOCK. In the example illustrated in FIG. 5, a request is registered by both Instruction Processor 3 and by the Maintenance Exerciser, resulting that signal (H) IP3 REQUEST LEVEL and signal (H) EXER REQUEST LEVEL should go High from clock phase 7 to clock phase 7 which does gate the flip-flops (shown in FIG. 4a) which do give rise to such signals. At the low occurrence of signal (L) φ1 OF 8, such request level signals are gated to set the Instruction Processor 3 and the exercise request flip-flops resulting in high signals (H) IP3 PRI FF and (H) EXER PRI FF respectively output therefrom. By momentary reference to FIG. 4b, it may be recalled that such setting of the request flip-flops did give rise to High signals (H) IP3, EXER PRI FF, (H) PRI ACTIVE, (H) PRI ENCLODE MSB, and (H) PRI ENCODE LSB. The decode proceeding from the last two such signals does cause signal (L) IP3 PRI RANK 2 to go Low. Responsively to the High condition of signal (H) PRI ACTIVE, the second-level priority, bank availability permitting, does next return signal (H) ACKNOWLEDGE during time C' from clock phase 1 to clock phase 5 of the second cycle of the 8-phase clock, 8$\phi$C2. This signal is gated in order that it may be delayed by the Low occurrence of clock phase 4 shown as signal (L) $\phi$4 OF 8 to produce Low signal (L) RESUME. During the Low occurrence of such signal (L) RESUME the low occurrence of clock phase 7 shown as signal (L) $\phi$7 OF 8 does first clear the Instruction Processor 3 request flip-flop, causing signal (H) IP3 PRI FF to go Low. Upon this occurrence, signal (H) ENCODE EXER SELECT may then go High, indicating that, the instruction processor request having been serviced, the exerciser request is now to be serviced. Upon the next following clock phase 3 represented by signal (L) $\phi$3 OF 8, such High condition of signal (H) ENCODE EXER SELECT will allow the setting of exerciser priority flip-flop rank 2, causing signal (L) EXER PRI FF RANK 2 to go low.

Continuing in FIG. 5, the continuing High occurrence of signal (H) PRI ACTIVE does result in yet another, second, acknowledge from second-level priority occurring as High signal (H) ACKNOWLEDGE at time C', from clock phase 1 to clock phase 5, of 8$\phi$C4. This second High occurrence of signal (H) ACKNOWLEDGE is again gated by clock phase 4 shown as Low signal (L) $\phi$4 OF 8 to again produce the Low resume signal (L) RESUME. Upon the occurrence of clock phase 7, shown as Low signal (L) $\phi$7 OF 8 this Low condition of signal (L) RESUME will, during the Low condition of signal (L) EXER PRI FF RANK 2, cause the clearing of the exerciser request flip-flop, resulting in signal (H) EXER PRI FF going Low. Resultantly to the fact that signal (H) IP3 PRI FF and (H) EXER PRI FF are now both Low, signals (H) IP3, EXER PRI FF, (H) PRI ACTIVE, (H) PRI ENCODE SB, and (H) PRI ENCODE LSB do also go Low. Further, signal (L) IP3 PRI RANK 2 does return to the High state while signal (H) ENCODE EXER SELECT will return to the Low state.

While the method and apparatus of the present invention has been taught with reference to a particular preferred embodiment implementation, it is to be recognized that equivalent implementations may suggest themselves to those of skill in the art upon a reading of the present specification disclosure. For example, the function of the resume flip-flop RESUME FF 408 shown in FIG. 4a is merely to delay the acknowledge signal received back from latter, second-level priority as High signal (H) ACKNOWLEDGE on line 403 in order that it may thence be used, being transformed to signal (L) RESUME on line 437, to clear the request flip-flops, including both IP3 PRI FF 418 and EXER PRI FF 422. Obviously, if the timing of such acknowledge signal was already satisfactory for the function of the present circuit, then no such delay would be required. Therefore, the following claims should be interpretted so as to encompass all such equivalents which might suggest themselves to one skilled in the art upon a reading of the present specification.

What is claimed is:

1. A modification to a priority circuit apparatus within a digital memory unit to the end that two requestor-users of said digital memory unit should share a single port out of n such ports, the request signals to which ports are prioritized within said priority circuit, said priority circuit apparatus modification comprising;

n+1 priority flip-flop means for receiving on n+1 ports, the respective requests of n+1 requestor means, and for holding said requests until each request is respectively individually cleared;

combining means for receiving and combining two of the requests as are held within two of said n+1 priority flip-flop means, producing thereby a single one combined request;

n-wide prioritization means for prioritizing (collectively during such time as said requests are held) said single one combined request, plus the remaining n−1 requests as are held within the remaining n−1 priority flip-flop means which are the n+1 priority flip-flop means minus said two priority flip-flop means, thusly prioritizing n total requests to form n prioritized requests;

prioritized request acknowledgement means for sequentially receiving upon consecutive times said n prioritized requests and for producing acknowledgements to each such upon so many consecutive times as each may be held;

priority flip-flop clearing means for receiving said acknowledgements upon consecutive times from said prioritized request acknowledgement means and, responsively to the acknowledgements of the n−1 of said n prioritized requests which did arise from said remaining n−1 priority flip-flop means, for clearing upon each of n−1 acknowledgements upon n−1 times said remaining n−1 priority flip-flop means WHILE ALSO for receiving the acknowledgements upon consecutive times of that particular one of said n prioritized requests which did arise from said single one combined request and for, upon a first acknowledgement upon a first consecutive time, clearing a first one of said two of said n+1 priority flip-flop means and then, upon a next consecutive second acknowledgement upon a second consecutive time, clearing said second one of said two of said n+1 priority flip-flop means;

WHEREIN said clearing means do ultimately responsively to n+1 total acknowledgements upon n+1 consecutive times cause the clearing of n+1 requests having been prioritized as (a combined two) plus (a remaining n−1) in n-wide prioritization means and presented as n prioritized requests respectively on (n−1 times) plus (two times), thusly on a total of n+1 consecutive times, to prioritized request acknowledgement means which did acknowledge said n+1 consecutive times of presentation with n+1 acknowledgements.

2. The priority circuit apparatus modification of claim 1 wherein said combining means further comprises:

combining means for receiving and combining the request of an instruction processor type requestor-user which is held within a first, and the request of a maintenance exerciser type requestor-user which is held within a second, of said n+1 priority flip-flop means, producing thereby a single one combined request.

3. The priority circuit apparatus modification of claim 1 wherein n=4.

* * * * *